(12) United States Patent
Huang et al.

(10) Patent No.: US 12,410,364 B2
(45) Date of Patent: Sep. 9, 2025

(54) ELECTROCHROMIC COMPOSITION AND ELECTROCHROMIC DEVICE

(71) Applicant: TAI YING OPTRONICS CO., LTD., Taichung (TW)

(72) Inventors: Hao-Ping Huang, Taichung (TW); Tsung-Hsien Lin, Taichung (TW); Yu-Nan Lee, Taichung (TW)

(73) Assignee: TAI YING OPTRONICS CO., LTD., Taichung (TW)

( * ) Notice: Subject to any disclaimer, the term of this patent is extended or adjusted under 35 U.S.C. 154(b) by 468 days.

(21) Appl. No.: 18/174,114

(22) Filed: Feb. 24, 2023

(65) Prior Publication Data
US 2024/0085753 A1     Mar. 14, 2024

(30) Foreign Application Priority Data

Aug. 22, 2022   (TW) ................... 111131431

(51) Int. Cl.
*G02F 1/155*     (2006.01)
*C09K 9/02*      (2006.01)
(Continued)

(52) U.S. Cl.
CPC .............. *C09K 9/02* (2013.01); *G02F 1/1516* (2019.01); *C09K 2211/1029* (2013.01); *G02F 1/161* (2013.01)

(58) Field of Classification Search
CPC ........ G02F 1/155; G02F 1/161; G02F 1/1516; C09K 9/02; C09K 2211/1029
See application file for complete search history.

(56) References Cited

U.S. PATENT DOCUMENTS

| 4,761,061 A * | 8/1988 | Nishiyama .............. G02F 1/161 |
| | | 359/265 |
| 2011/0242046 A1 * | 10/2011 | Feng ..................... G06F 3/0445 |
| | | 345/174 |

(Continued)

OTHER PUBLICATIONS

Mi Ouyang, Zhiyan Fu, Xiaojing Lv, Bin Hu, Pingjing Wang, Senbiao Huang, Yuyu Dai, and Cheng Zhang, A Multichromic Copolymer Based on 4-(9H-carbazol-9-yl)-N, N-diphenylaniline and 3,4-ethylenedioxythiophene Prepared via Electrocopolymerization, Journal of the Electrochemical Society, 160(11) H787-H792 (Year: 2013).*

*Primary Examiner* — Bijan Ahvazi
(74) *Attorney, Agent, or Firm* — McClure, Qualey & Rodack, LLP

(57) ABSTRACT

An electrochromic composition including: a first oxidizable compound; a reducible compound; an electrolyte; and a solvent, wherein the first oxidizable compound is represented by the following formula:

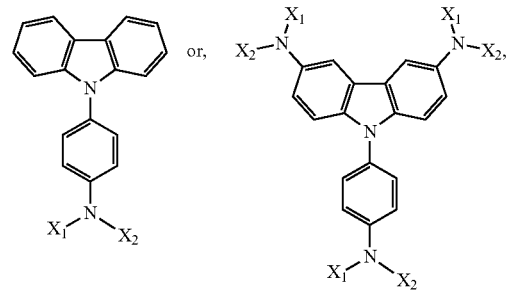

wherein $X_1$, and $X_2$ are independently substituted or unsubstituted aliphatic hydrocarbon groups, or substituted or unsubstituted aromatic hydrocarbon groups, wherein the aromatic hydrocarbon groups include:

(Continued)

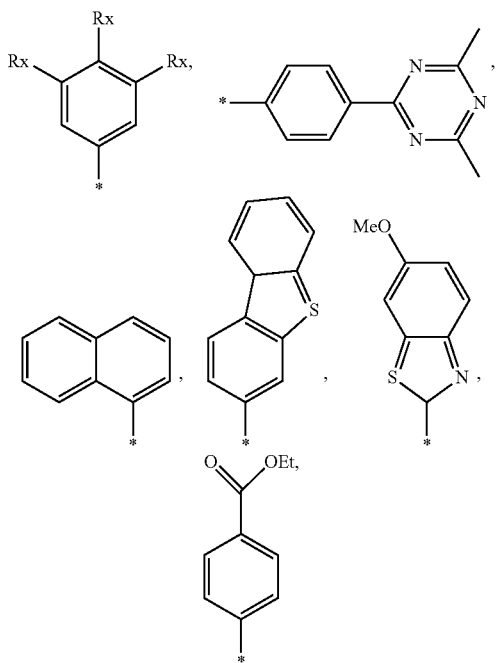

wherein each $R_x$ is independently hydrogen, a C1-C16 alkyl group, a C1-C16 alkoxy group, a C1-C16 haloalkyl group, or halogen.

15 Claims, 15 Drawing Sheets

(51) Int. Cl.
  *G02F 1/1516* (2019.01)
  *G02F 1/161* (2006.01)

(56) References Cited

U.S. PATENT DOCUMENTS

| | | | |
|---|---|---|---|
| 2014/0240652 A1* | 8/2014 | Satoh | G09F 9/35 359/290 |
| 2019/0001631 A1* | 1/2019 | Hirakata | B32B 27/288 |
| 2021/0098712 A1* | 4/2021 | Gao | C07D 209/86 |

\* cited by examiner

ELECTROCHROMIC COMPOSITION AND ELECTROCHROMIC DEVICE

CROSS REFERENCE TO RELATED APPLICATIONS

This Application claims priority of Taiwan Patent Application No. 111131431, filed on Aug. 22, 2022, the entirety of which is incorporated by reference herein.

BACKGROUND

Technical Field

The disclosure relates to an electrochromic composition, and, in particular, to an electrochromic composition of triphenylamine derivatives and its application.

Description of the Related Art

Electrochromism is a phenomenon in which the optical properties (reflectivity, transmittance, absorptivity, etc.) of a material undergo a stable and reversible change under the application of an external electric field, which is manifested as a reversible change in color and transparency in appearance.

In current research of electrochromism, there are two main categories of electrochromic materials: inorganic materials including transition metal oxides and Prussian blue; and organic materials including organic compounds and polymers. Due to requirements on the lifespan and durability of electrochromic materials, most of the electrochromic materials are made of inorganic oxides. However, the preparation of inorganic oxides mostly relies on methods such as vacuum evaporation, spray thermal decomposition, and sputtering, which require expensive equipment for coating, and the production costs are relatively high. In addition, inorganic oxides also have the disadvantages of slow color change and relatively single color tone of electrochromism. In contrast, electrochromic organic materials are mostly conjugated molecules, which have the advantages of various color choices and fast color change. However, electrochromic conjugated molecules have the disadvantages of insufficient thermal stability, short lifespan, etc.

In summary, there is an urgent need for new electrochromic organic materials to meet the requirements of high reliability and high shielding properties at the same time.

SUMMARY

The present disclosure provides an electrochromic composition, including: a first oxidizable compound; a reducible compound; an electrolyte; and a solvent, wherein the first oxidizable compound is represented by the following formula:

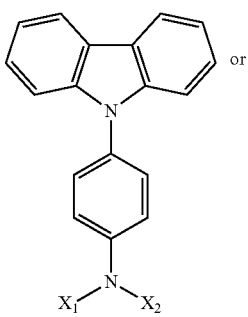

or

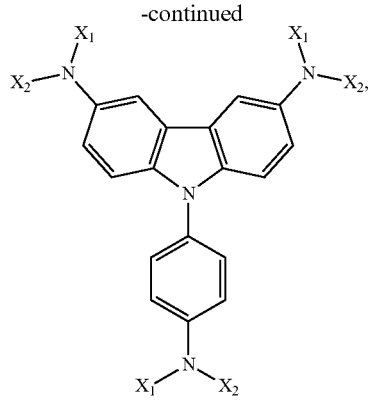

wherein $X_1$, and $X_2$ are independently substituted or unsubstituted aliphatic hydrocarbon groups, or substituted or unsubstituted aromatic hydrocarbon groups, wherein the aromatic hydrocarbon groups include:

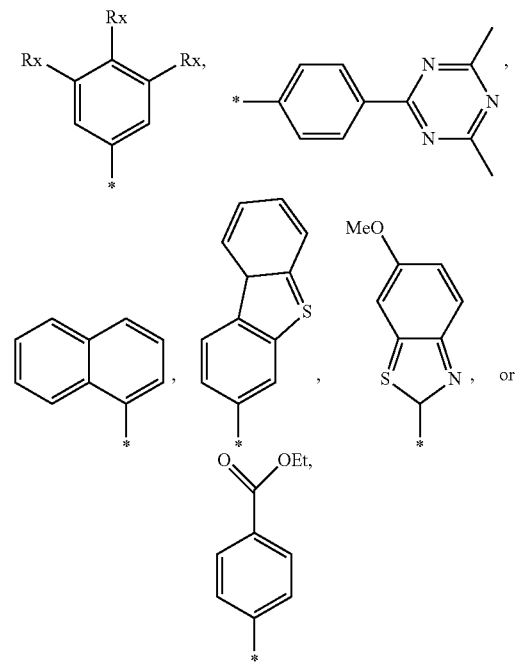

wherein each $R_x$ is independently hydrogen, a C1-C16 alkyl group, a C1-C16 alkoxy group, a C1-C16 haloalkyl group, or halogen.

The present disclosure also provides an electrochromic device, including:
a pair of electrodes, including: a first transparent substrate with a first transparent conductive layer on one of its surfaces; and a second transparent substrate with a second transparent conductive layer on one of its surfaces, wherein the first transparent conductive layer and the second transparent conductive layer are disposed opposite to each other; an isolating unit interposed between the first transparent conductive layer and the second transparent conductive layer such that a cell is formed between the first transparent substrate, the second transparent substrate and the isolating unit; and an electrochromic compound filled into the cell, wherein the electrochromic compound is as the abovementioned electrochromic device.

BRIEF DESCRIPTION OF THE DRAWINGS

Aspects of this disclosure are best understood from the following detailed description when read with the accompanying figures. It should be noted that, in accordance with common practice in the industry, various features are not drawn to scale. In fact, the dimensions of the various features may be arbitrarily increased or reduced for clarity of discussion.

DETAILED DESCRIPTION

Figure 1:
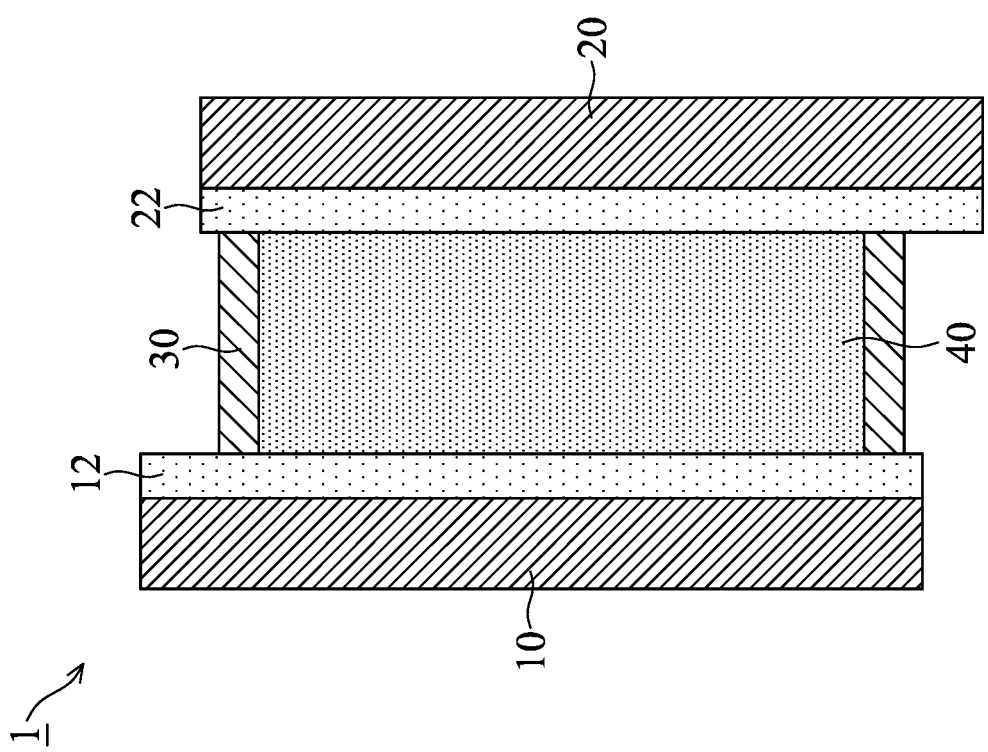
FIG. 1 shows a schematic diagram of the electrochromic device according to an embodiment of the present disclosure.

The following disclosure provides various embodiments, or examples, for implementing different features of the subject matter provided. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features. In addition, the present disclosure may repeat reference numerals and/or letters in the various examples. This repetition is for the purpose of simplicity and clarity and does not in itself dictate a relationship between the various embodiments and/or configurations discussed.

Triphenylamine is a propeller-shaped molecule with good thermal stability, molecular stability and optoelectronic properties. Combined with its high oxidizing properties, superior electroactivity, photoactivity, and high stability as radical cations, triphenylamine becomes a good electron donor and hole transporting material, and thus it is widely used in optoelectronic components.

However, the application of triphenylamine in the electrochromic field still has the disadvantages of low shielding property and poor heat resistance. Therefore, in the present disclosure, modified triphenylamine derivatives are obtained by introducing carbazole structures, thereby improving the shielding property and contrast ratio of the devices using such electrochromic compounds, as well as the operational reliability of the device at high temperature.

The present disclosure provides an electrochromic composition, including: a first oxidizable compound; a reducible compound; an electrolyte; and a solvent, wherein the first oxidizable compound is represented by the following formula:

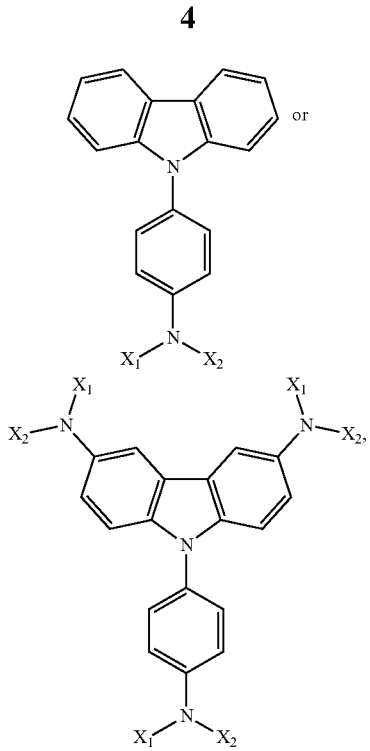

wherein $X_1$, and $X_2$ are independently substituted or unsubstituted aliphatic hydrocarbon groups, or substituted or unsubstituted aromatic hydrocarbon groups, wherein the aromatic hydrocarbon groups include:

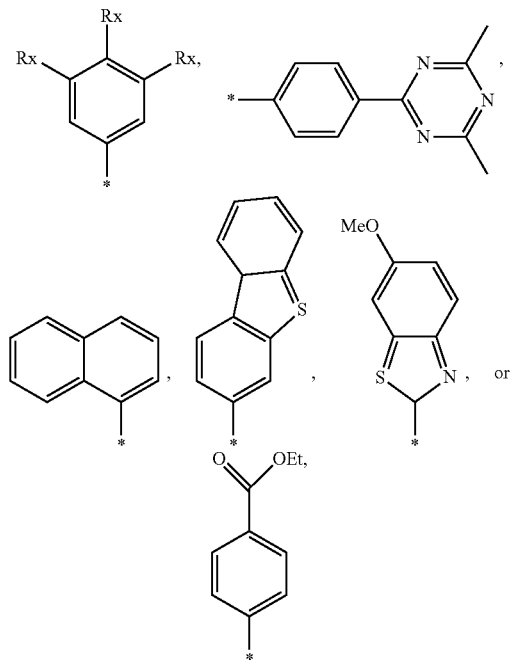

wherein each $R_x$ is independently hydrogen, a C1-C16 alkyl group, a C1-C16 alkoxy group, a C1-C16 haloalkyl group, or halogen.

The term "substituted" refers to moieties having substituents replacing a hydrogen on one or more carbons or heteroatoms of the structure. It will be understood that "substitution" or "substituted" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. As used herein, the term "substituted" is contemplated to include all permissible substituents of organic compounds. It will be understood by those skilled in the art that substituents can themselves be substituted, if appropriate. Unless specifically stated as "unsubstituted," references to chemical moieties herein are understood to include substituted variants. For example, reference to an "aryl" group or moiety implicitly includes both substituted and unsubstituted variants.

The term "aliphatic hydrocarbon group" used herein refers to a saturated or unsaturated functional group containing only carbon atoms and hydrogen atoms. Also, "aliphatic hydrocarbon group" refers to a straight chain, branched chain or cyclic aliphatic hydrocarbon group, such as a C1-C16 aliphatic hydrocarbon group. Examples of straight chain aliphatic hydrocarbon groups include, such as, but not limited to methyl group, ethyl group, n-propyl group, n-butyl group, n-pentyl group, n-hexyl group, n-heptyl group, n-octyl group, vinyl group, propenyl group, butenyl group, pentenyl group, hexenyl group, heptenyl group, octenyl group, ethynyl group, propynyl group, butynyl group, pentynyl group, hexynyl group, heptynyl group and octynyl group. Examples of branched chain aliphatic hydrocarbon groups include, such as, but are not limited toisopropyl group, isobutyl group, tert-butyl group, sec-butyl group, 2-methylbutyl group, sec-pentyl group, neopentyl group, neohexyl group, and 2-ethylhexyl group. Examples of cyclic aliphatic hydrocarbon groups include, such as, but are not limited to: cyclopropyl group, cyclopentyl group, cyclohexyl group, cycloheptyl group, cyclooctyl group, cyclopentenyl group, cyclohexenyl group, cycloheptenyl group, and cyclooctenyl group. The abbreviation "Me" used herein refers to a methyl group, and the abbreviation "Et" refers to an ethyl group.

The term "substituted aliphatic hydrocarbon group" herein refers to the above-mentioned aliphatic hydrocarbon group substituted by specific groups, substituents or moieties, such as, but not limited to a halogen, a hydroxyl group, an oxy group, a thio group, an acyl group or an acyloxy group substituted above-mentioned aliphatic hydrocarbon groups. For example, a C1-C16 haloalkyl group (such as a trifluoromethyl group, a pentafluoroethyl group, a 2,2,2-trifluoroethyl group, etc.); a C1-C16 alkoxy group (such as a methoxy group, a trifluoromethoxy group, an ethoxy group, an n-propoxy group, an isopropoxy group, an n-butoxy group, an isobutoxy group, a sec-butoxy group, a tert-butoxy group, an n-pentoxy group, a sec-pentoxy group, a 2-methylbutoxy group, an n-hexyloxy group, a cyclohexyloxy group, an n-heptyloxy group, a cycloheptyloxy group, an n-octyloxy group, a cyclooctyloxy group, a 2-ethylhexyloxy group, a pentafluoroethoxy group or a 2,2,2-trifluoroethoxy group, etc.); a C1-16 alkylthio group (such as a methylthio group, an ethylthio group, an n-propylthio group, an isopropylthio group, an n-butylthio group, an isobutylthio group, a sec-butylthio group, a tert-butylthio group, an n-pentylthio group, a sec-pentylthio group, a n-hexylthio group, a cyclohexylthio group, a n-heptylthio group, a cycloheptylthio group, an n-octylthio group, a cyclooctylthio group, a 2-ethylhexylthio group, a trifluoromethylthio group, a pentafluoroethylthio group, a 2,2,2-trifluoroethylthio group, a vinylthio group, a propylenethio group, a butenylthio group, a pentenylthio group, a cyclopentenylthio group, a hexenylthio group, a cyclohexenylthio group, a heptenylthio group, a cycloheptenylthio group, an octenylthio group, a cyclooctenethio group, an ethynylthio group, a propynylthio group, a butynylthio group, a pentynylthio group, a hexynylthio group, a heptynylthio group, an octynylthio group, etc.); a C1-16 alkanoyl group (such as a formyl group, an acetyl group, a propionyl group, a butyryl group, an isobutyryl group, a valeryl group, an isovaleryl group, etc.); and a C1-C16 alkanoyloxy group (such as a formyloxy group, an acetyloxy group, a propionyloxy group, a butyryloxy group, an isobutyryloxy group, etc.).

The above-mentioned aromatic hydrocarbon groups are monocyclic or condensed polycyclic aromatic hydrocarbon groups, such as C6-C30 aromatic hydrocarbon groups. Examples of the aromatic hydrocarbon group include, but not limited to a phenyl group, a naphthyl group, an anthracenyl group, a phenanthryl group, and an acenaphthyl group. The term "substituted aromatic hydrocarbon group" refers to the above-mentioned aromatic hydrocarbon group substituted by specific groups, substituents or moieties, such as but not limited to heteroatoms, halogens, alkyl groups, oxy groups, alkoxy groups, hydroxyl groups, thio groups, alkylthio groups, cyano groups, aryl groups, aryl alkoxy groups, alkoxycarbonyl groups and the like. For example: a heteroatom substituted C6-C30 aromatic hydrocarbon group (such as a thienyl group, a pyrrolyl group, a pyrazolyl group, a triazolyl group, a triazinyl group, an oxazolyl group, an oxadiazolyl group, a thiazolyl group, a pyridyl group, a pyrimidinyl group, a pyridazinyl group, a pyrazinyl group, a quinolyl group, a quinoxalinyl group, a benzothienyl group, a benzimidazolyl group, a benzotriazolyl group, a benzofuranyl group, a dibenzothiophenyl group, a benzothiazolyl group, etc.), a C6-C30 alkylphenyl group (e.g. a tolyl group, an ethylphenyl group, a xylyl group, a propylphenyl group, a mesityl group, a methylethylphenyl group, a cumyl group, a butylphenyl group, an isobutylphenyl group, a tert-butylphenyl group, etc.), a C6-C30 haloalkylphenyl group (such as a trifluoromethylphenyl group, a difluoromethylphenyl group, a fluoromethylphenyl group, a trifluoroethylphenyl group, a difluoroethylphenyl group, a fluoroethylphenyl group, a trichloromethylphenyl group, a dichloromethylphenyl group, a chloromethylphenyl group, a trichloroethylphenyl group, a dichloroethylphenyl group, a chloroethylphenyl group, etc.), a C6-C30 alkoxyaryl group (e.g. a methoxyphenyl group, a dimethoxyphenyl group, a trimethoxyphenyl group, a ethoxyphenyl group, a diethoxyphenyl group, a triethoxyphenyl group, a methoxynaphthyl group, a propoxyphenyl group, a butoxyphenyl group, a pentoxyphenyl group, etc.), a C6-C30 aryl-carbonyl group (such as a benzoyl group, a naphthoyl group, etc.), a C6-30 halogenated aryl group (such as a chlorophenyl group, a bromophenyl group, a fluorophenyl group, a dichlorophenyl group, a dibromophenyl group, a pentachlorophenyl group, a pentabromophenyl group, a pentafluorophenyl group, etc.), a C6-30 cyanoaryl group (such as a 4-cyanophenyl group, a 2,4-dicyanophenyl group, a 2,4,6-tricyanophenyl group, etc.), a C6-30 alkoxycarbonyl phenyl group (such as a methoxycarbonyl phenyl group, an ethoxycarbonyl phenyl group, a propoxycarbonyl phenyl group, etc.) etc.

In some embodiments, the first oxidizable compound can be prepared by the following method. As shown in Formula 1, 3,6-dibromo-9-(4-bromophenyl)-9H-carbazole may be synthesized by heating 3,6-dibromo-9H-carbazole and 1-bromo-4-fluorobenzene in dimethylacetamide solvent to 150-200° C. with stirring. Then, the diphenylamine compound may be synthesized by heating bromobenzene and aniline in toluene solvent to 100-150° C. with stirring using tri-tert-butylphosphine as catalyst. Finally, 3,6-dibromo-9-(4-bromophenyl)-9H-carbazole and the diphenylamine compound may be heated to 100-150° C. in toluene solvent with stirring using tri-tert-butylphosphine as catalyst to obtain the triphenylamine derivative with carbazole structure, wherein $Y_1$ and $Y_2$ are independently hydrogens, C1-C16 alkyl groups, C1-C16 alkoxy groups, C1-C16 haloalkyl groups, halogens, aryl groups, heterocyclic groups, etc.

0.03M-0.46M, 0.06M-0.41M, 0.09-0.36M, 0.12M-0.31M, 0.15M-0.24M, and 0.18M-0.2M. According to some embodiments of the present disclosure, the concentration of the reducible compound is 0.01M-0.5M, such as 0.03M-0.46M, 0.06M-0.41M, 0.09-0.36M, 0.12M-0.31M, 0.15M-0.24M, and 0.18M-0.2M. In some embodiments, the molar ratio of the first oxidizable compound to the reducible compound is 1:0.01 to 1:50, such as 1:0.04 to 1:46, 1:0.09 to 1:41, 1:0.14 to 1:36, 1:0.19 to 1:31, 1:0.21 to 1:28, 1:0.26

(Formula 1)

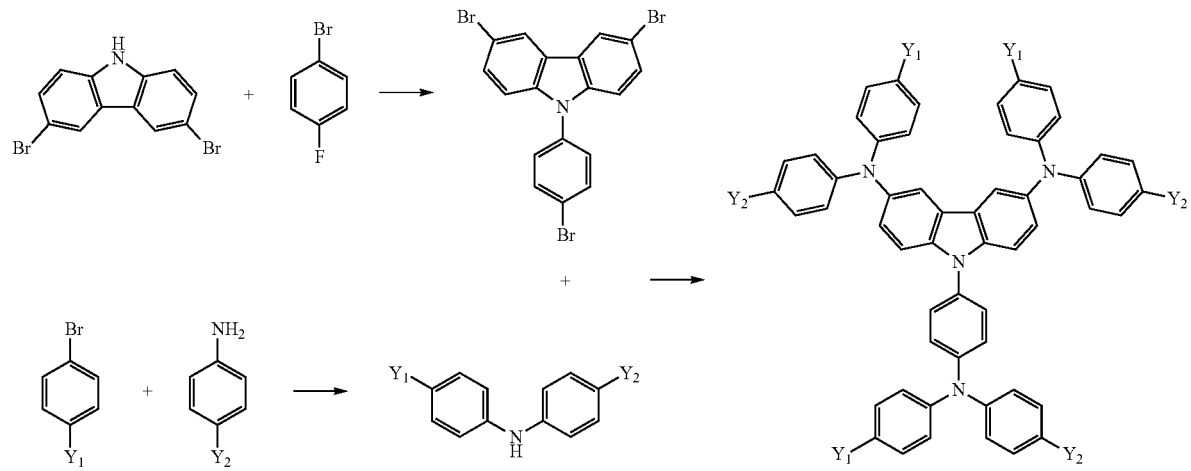

According to some embodiments of the present disclosure, the reducible compound includes:

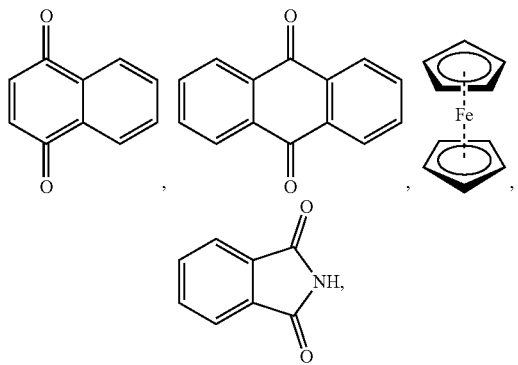

viologen compound and the combination thereof. In some embodiments, the viologen compound is an alkyl viologen, such as hexyl viologen, heptyl viologen, octyl viologen, etc. In some embodiments, the reducible compound is represented as

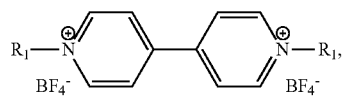

wherein $R_1$ is a C1-C16 alkyl group.

According to some embodiments of the present disclosure, the concentration of the first oxidizable compound in the electrochromic composition is 0.01M-0.5M, such as to 1:26, 1:0.31 to 1:21, 1:0.36 to 1:16, 1:0.41 to 1:11, 1:0.46 to 1:5, 1:0.51 to 1:1, 1:0.64 to 1:0.9, and 1:0.71 to 1:0.81.

According to some embodiments of the present disclosure, the electrolyte includes lithium salts, amine salts, tetraalkylammonium salts, or imidazolium salts. In some embodiments, the lithium salts include $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LIN(SO_2CF_3)$, $LiSCN$, $LIN(SO_2CF_3)_2$, $LiO_3SCF_2CF_3$, $LiC_6F_5SO_3$, $LiO_2CCF_3$, $LiSO_3F$, $LiB(C_6H_5)$, $LiCF_3SO_3$, or the combination thereof. In some embodiments, the amine salts include trifluoromethanesulfonimide salts, dicyanamide salts, ammonium tetrafluoroborate salts, ammonium tetrachloroaluminate salts, ammonium hexafluorophosphate salts, ammonium halide salts, or the combination thereof. In some embodiments, the tetraalkylammonium salts includes tetraalkylammonium bromide, tetraalkylammonium perchlorate, tetraalkylammonium tetrafluoroborate, or the combination thereof. In some embodiments, the imidazolium salts include alkylimidazolium trifluoromethanesulfonates, alkylimidazolium tetrafluoroborates, alkylimidazolium tetrachloroaluminates, alkylimidazolium halides, or the combination thereof. In some embodiments, the concentration of the electrolyte in the electrochromic composition is 0.01M-5M, such as 0.03M-4.6M, 0.06M-4.1M, 0.09-3.6M, 0.12M-3.1M, 0.15M-2.6M, 0.18M-2.1M, 0.21M-1.6M, 0.26M-1.1M, 0.31M-0.6M, 0.36M-0.51M, and 0.05M-0.5M.

Solvents include all solvents which are inert to redox at the selected voltage and which cannot dissociate to form electrophilic or nucleophilic groups, or which themselves do not act as sufficiently strong electrophilic or nucleophilic groups therefore do not react with colored ionic free radicals. According to some embodiments of the present disclosure, the solvents include propylene carbonate, acetonitrile, γ-butyrolactone, ethylene carbonate, sulfolane, dioxolane, tetrahydrofuran, 2-methyltetrahydrofuran, dimethylsulfoxide, dimethoxyethane, ethoxymethoxyethane, polyethylene glycol, and alkyl alcohols (such as isobutanol, n-octanol, etc.), or the combination thereof.

According to some embodiments of the present disclosure, the electrochromic composition may further include a second oxidizable compound that is different from the first oxidizable compound. The second oxidizable may include:

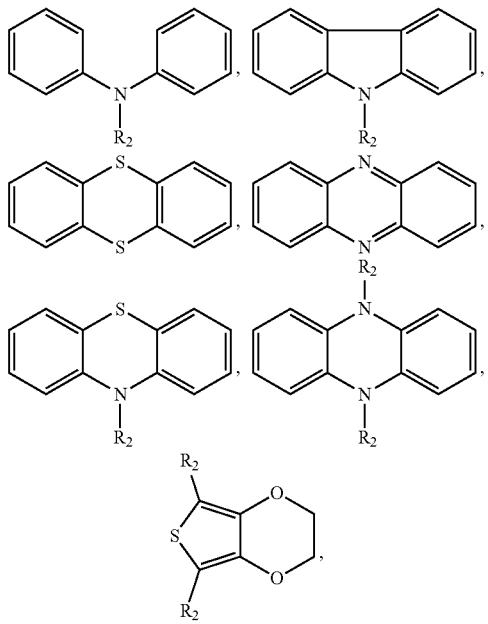

or the combination thereof, wherein $R_2$ is hydrogen or an optionally substituted alkyl group. In some embodiments, the concentration of the second oxidizable compound in the electrochromic composition ranges from 0.01M-0.5M, such as 0.03M-0.46M, 0.06M-0.41M, 0.09-0.36M, 0.12M-0.31M, 0.15M-0.24M, and 0.18M-0.2M. In some embodiments, the molar ratio of the first oxidizable compound to the second oxidizable compound is 1:0.01 to 1:50, such as 1:0.04 to 1:46, 1:0.09 to 1:41, 1:0.14 to 1:36, 1:0.19 to 1:31, 1:0.21 to 1:28, 1:0.26 to 1:26, 1:0.31 to 1:21, 1:0.36 to 1:16, 1:0.41 to 1:11, 1:0.46 to 1:5, 1:0.51 to 1:1, 1:0.64 to 1:0.9, and 1:0.71 to 1:0.81.

According to some embodiments of the present disclosure, the electrochromic composition may further include a UV absorber (for example: benzoates, salicylates, benzophenones, benzotriazoles, cinnamates, triazines, oxamides, etc.), a UV blocker (for example: derivatives of 2,2,6,6-tetramethylpiperidine structure, etc.), an IR blocker (for example: tungsten bronzes, which can be represented as $M_xWO_3$, wherein M=Li, Na, K, Rb or Cs, etc.), an IR absorber (for example: derivatives of nitrogen-containing aniline, etc.), or the combination thereof, their respective concentrations range from 0.01M-5M, such as 0.03M-4.6M, 0.06M-4.1M, 0.09-3.6M, 0.12M-3.1M, 0.15M-2.6M, 0.18M-2.1M, 0.21M-1.6M, 0.26M-1.1M, 0.31M-0.6M, 0.36M-0.51M, and 0.05M-0.5M.

If the concentration of each component is too high, the component may be precipitated in the solvent, or there may be component cracking and damaged at high temperature; if the concentration of each component is too low, the electrochromic device may not able to change color.

In some embodiments, the electrochromic composition further includes polymers, such as alkyd resins, acrylic resins, acrylamide resins, polyester resins, styrene resins, phenolic resins, melamine resins, epoxy resin, polyurethane resin, nylon resin, polycarbonate, polyimide, or the combination thereof. By adding polymers to the electrochromic composition, the composition can be made into colloidal or solid state to improve its safety in use, and thus it can be used in energy-saving smart windows, automobile sunroofs, anti-glare rearview mirrors, electronic paper, electronic labels and other fields.

In some embodiments of the present disclosure, electrochromic devices are fabricated using the electrochromic compositions described above. Referring to FIG. 1, in some embodiments, a pair of electrodes of the electrochromic device 1 includes a first transparent conductive layer 12 on the surface of the first transparent substrate 10, and a second transparent conductive layer 22 on the surface of the substrate 20, wherein the first transparent conductive layer 12 and the second transparent conductive layer 22 are disposed opposite to each other. An isolation unit 30 is interposed between the first transparent conductive layer 12 and the second transparent conductive layer 22 to bond the pair of electrodes, and a cell is formed between the pair of electrodes and the isolation unit 30. Next, the electrochromic composition 40 is filled into the cell between the first transparent conductive layer 12 and the second transparent conductive layer 22 and the isolation unit 30 through the hole left on the isolation unit 30, and then the hole is sealed to form the electrochromic device 1.

In some embodiments, the first transparent substrate 10 and the second transparent substrate 20 can be made of glass or plastic (such as polycarbonate), and the first transparent conductive layer 12 and the second transparent conductive layer 22 include, for example, indium oxide Tin (ITO), antimony or fluorine doped tin oxide (FTO), antimony or aluminum doped zinc oxide, tin oxide, etc. The isolation unit 30 may be prepared by mixing gap fillers and thermosetting or photosetting (photochemically curable) adhesive. The adhesives are, for example, epoxy resins and acrylate resins. Fillers may be, for example, plastic, glass beads, certain sand powder, or the combination thereof. The thickness of the isolation unit 30 (i.e., the distance between the first transparent conductive layer 12 and the second transparent conductive layer 22) is between 1 μm and 300 μm, such as 3 μm-290 μm, 5 μm-280 μm, 10 μm-270 μm, 15 μm-260 μm, 20 μm-250 μm, 25 μm-240 μm, 30 μm-230 μm, 50 μm-200 μm, 60 μm-180 μm, 70 μm-160 μm, 80 μm-140 μm, 90 μm-120 μm, 95 μm-115 μm, or 100 μm-110 μm. If the distance between the transparent conductive layers is too small, electric leakage and uneven color change may occur. When the distance between the transparent conductive layers is too large, the reaction speed may become slow. When the electrochromic device is switched off, the electrochromic composition in neutral state is transparent. By applying a positive voltage to the electrochromic device, the color of the composition will gradually darken. Once the power is turned off, the electrochromic composition returns to its original transparent state in a short time (less than 1 second).

In order to make the above-mentioned and other purposes, features, and advantages of the present disclosure clearer and easier to understand, several examples, together with the drawings, are described in detail below.

EXAMPLES

Synthesis of the First Oxidizable Compound

The synthesis of the first oxidizable compound in the examples of the present disclosure will be described in detail below.

Oxidizable Compound A1

10 g of 9H-carbazole, 9.28 g of 1-fluoro-4-nitrobenzene and 9.99 g of fluorine carbonate were mixed in a reaction flask. Then 20 mL of dimethylacetamide was added to the reaction flask as solvent, and the mixture in the reaction flask was heated to 160° C. with stirring, and cooled down to room temperature after one day of reaction. Then the reaction mixture was poured into water to precipitate a solid. Then the solid was collected, rinsed and dried to obtain a white product of 9-(4-nitrophenyl)-9H-carbazole. The above reaction is shown in Formula 2.

the reaction flask as catalyst. The mixture in the reaction flask was heated to 110° C. with stirring, and cooled down to room temperature after one day of reaction. The reaction mixture was filtered and extracted twice with water. After removing the water from the organic layer, the organic layer was concentrated to dryness under reduced pressure. Then ethanol was added to precipitate a solid. The solid was collected, rinsed and dried to obtain a gray-black oxidizable compound A1. The above reaction is shown in Formula 4.

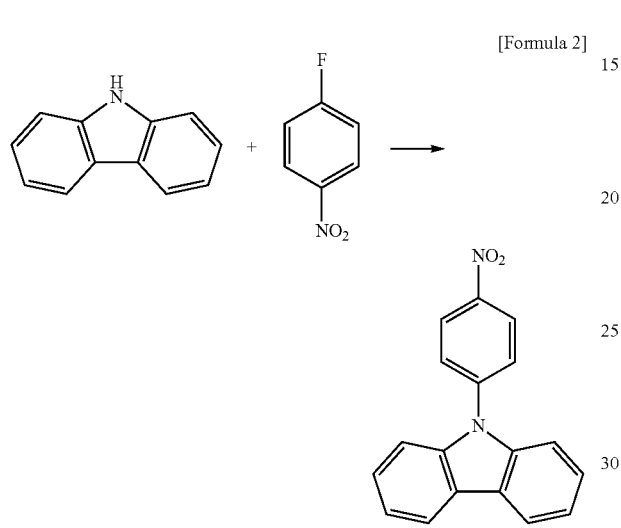

[Formula 2]

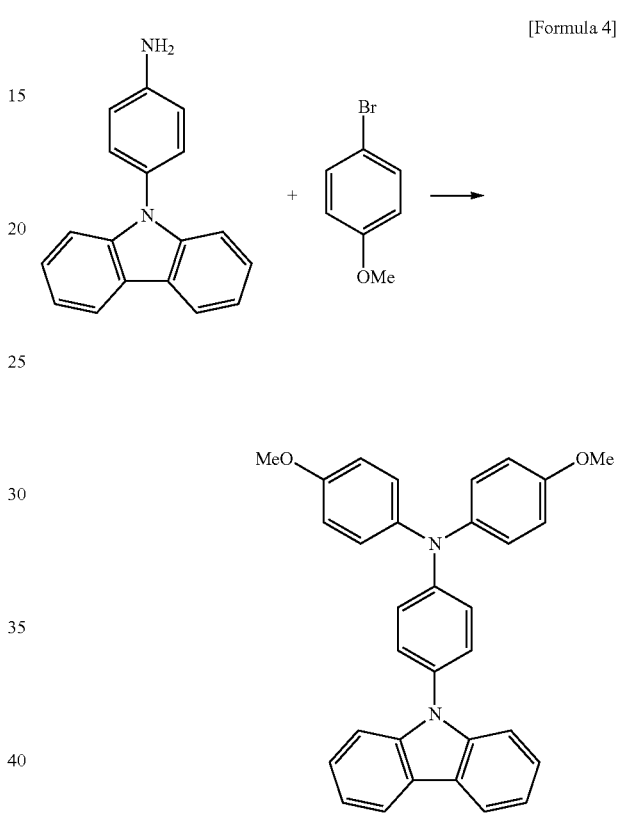

[Formula 4]

After that, 5 g of 9-(4-nitrobenzene)-9H-carbazole was mixed with 0.09 g of 10% carbon palladium in a reaction flask. 100 mL of ethanol was added to the reaction flask as solvent, and 4.17 g of hydrazine was added as catalyst to the reaction flask. The mixture in the reaction flask was heated to 80° C. with stirring, and cooled down to room temperature after one day of reaction. The reaction mixture was filtered and concentrated to dryness, and was extracted with water and ethyl acetate twice. After removing the water from the organic layer, the organic layer was concentrated to dryness under reduced pressure, and the white product of 4-(9H-carbazol-9-yl)aniline was collected. The above reaction is shown in Formula 3.

Oxidizable Compound A2

10 g of 3,6-dibromo-9H-carbazole, 7 g of 1-bromo-4-fluorobenzene and 13 g of caesium carbonate were mixed in a reaction flask. Then 80 mL of dimethylacetamide was added as solvent to the reaction flask. The mixture in the reaction flask was heated to 160° C. with stirring, and cooled down to room temperature after one day of reaction. Pour the reaction mixture into water to precipitate a solid. The solid was collected, rinsed and dry to obtain the white product of 3,6-dibromo-9-(4-bromophenyl)-9H-carbazole), the above reaction is shown in Formula 5.

[Formula 3]

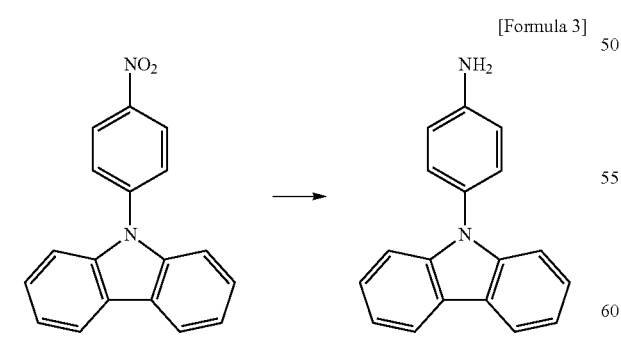

5 g of 4-(9H-carbazol-9-yl)aniline, 9.05 g of 1-bromo-4-methoxybenzene and 5.58 g of sodium tert-butoxide were mixed in a reaction flask. 100 mL of toluene was added as solvent to the reaction flask, and 0.33 g of palladium metal complex and 0.31 g of tri-tert-butylphosphine was added to

[Formula 5]

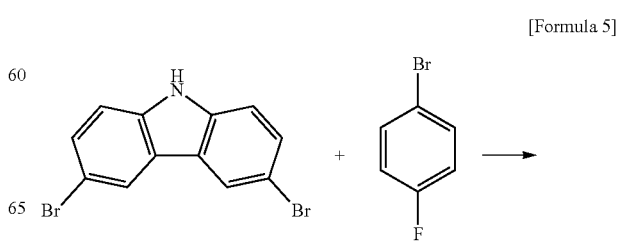

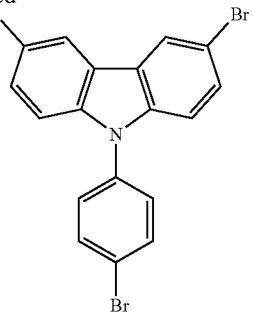

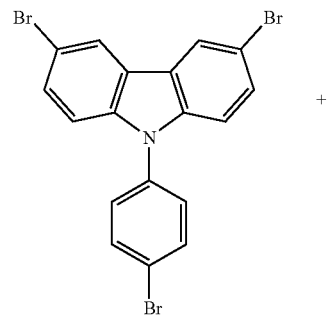

[Formula 7]

10 g of 1-bromo-4-methoxybenzene, 7.9 g of 4-methoxyaniline and 10.3 g of sodium tertiary butoxide were mixed in a reaction flask. 80 mL of toluene was added to the reaction flask as solvent, then 0.61 g of palladium metal complex and 0.65 g of tri-tert-butylphosphine were added as catalyst to the reaction flask. The mixture in the reaction flask was heated to 110° C. with stirring, and cooled down to room temperature after one day of reaction. The reaction mixture was filtered and extracted twice with water. After removing the water from the organic layer, the organic layer was concentrated to dryness under reduced pressure. Then ethanol was added to precipitate a solid. The solid was collected, rinsed and dried, then the gray-black product of bis(4-methoxyphenyl)amine was obtained. The above reaction is shown in Formula 6.

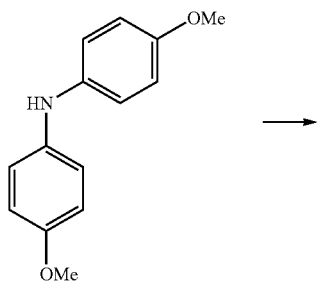

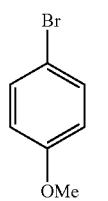 + 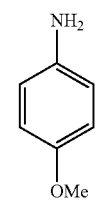 → 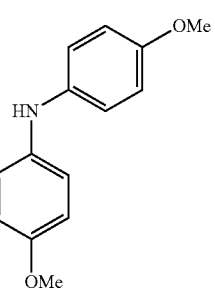

[Formula 6]

5 g of 3,6-dibromo-9-(4-bromophenyl)-9H-carbazole, 7.6 g of bis(4-methoxyphenyl)amine and 5 g of sodium tert-butoxide were mixed in a reaction flask. 125 mL of toluene was added to the reaction flask as solvent, then 0.3 g of palladium metal complex and 0.25 g of tri-tert-butylphosphine were added to the reaction flask as catalyst. The mixture in the reaction flask was heated to 110° C. with stirring, and cooled down to room temperature after one day of reaction. The reaction mixture was filtrated and extracted twice with water. After removing the water from the organic layer, alumina was added to the organic layer. Then the organic layer was heated to 70° C. for 1 hour with stirring, and filtered. The liquid was collected and concentrated under reduced pressure until it was completely dry. Then ethanol was added to precipitate a solid. The solid was collected, rinsed and dried to obtain the yellow oxidizable compound A2. The above reaction is shown in Formula 7.

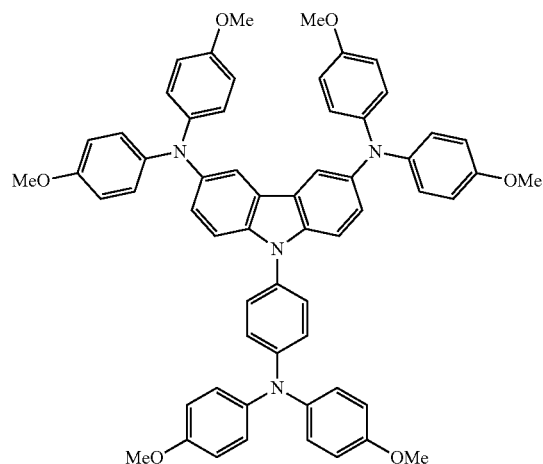

Oxidizable Compound A3

10 g of 1-bromo-4-fluorobenzene, 8.4 g of 4-methoxyaniline and 10.9 g of sodium tert-butoxide were mixed in a reaction flask mix. 150 mL of toluene was added to the reaction flask as solvent, and 0.65 g of palladium metal complex and 0.69 g of tri-tert-butylphosphine were added to the reaction flask as catalyst. The mixture in the reaction flask was heated to 110° C. with stirring, and cooled down to room temperature after one day of reaction. The reaction mixture was filtered and extracted twice with water. After removing the water from the organic layer, the organic layer was concentrated to dryness under reduced pressure. After collecting the liquid, the product 4-fluoro-N-(4-methoxyphenyl)aniline was obtained. The above reaction is shown in Formula 8.

[Formula 8]

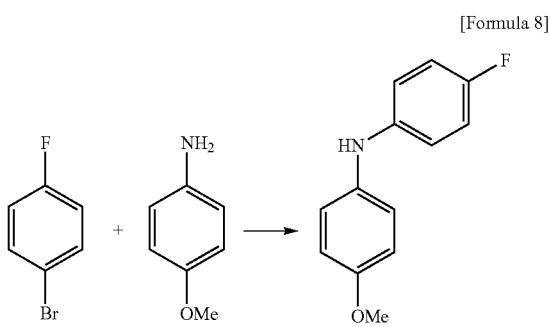 [SMILES: Fc1ccc(Br)cc1 ; COc1ccc(N)cc1 ; COc1ccc(Nc2ccc(F)cc2)cc1]

5 g of 3,6-dibromo-9-(4-bromophenyl)-9H-carbazole (the reaction is shown in Formula 5), 7.2 g of 4-fluoro-N-(4-methoxyphenyl)aniline and 5 g of sodium tert-butoxide were mixed in a reaction flask. 125 mL of toluene was added to the reaction flask as solvent, and 0.3 g of palladium metal complex and 0.25 g of tri-tert-butylphosphine were added to the reaction flask as catalyst. The mixture in the reaction flask was heated to 110° C. with stirring, and cooled down to room temperature after one day of reaction. The reaction mixture was filtrated and extracted twice with water. After removing the water from the organic layer, alumina was added to the organic layer. Then the organic layer was heated to 70° C. for 1 hour with stirring, and then filtered. The liquid was collected and concentrated under reduced pressure until completely dried. Then ethanol was added to precipitate a solid. The solid was collected, rinsed and dried to obtain the yellow oxidizable compound A3. The above reaction is shown in Formula 9.

[Formula 9]

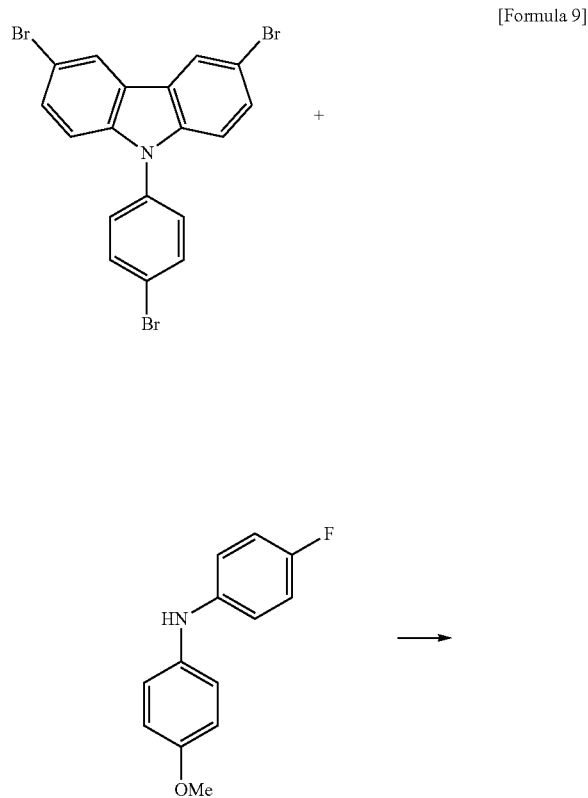

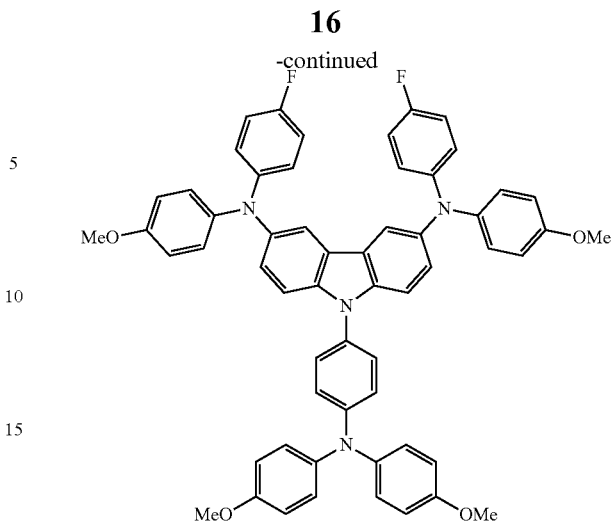

Oxidizable Compound A4

10 g of 3-bromodibenzo[b,d]thiophene, 5.6 g of 4-methoxyaniline and 7.3 g of sodium tert-butoxide were mixed in a reaction flask. 150 mL of toluene was added to the reaction flask as solvent, and 0.43 g of palladium metal complex and 0.46 g of tri-tert-butylphosphine was added into the reaction flask as catalyst. The mixture in the reaction flask was heated to 110° C. with stirring, and cooled down to room temperature after one day of reaction. The reaction mixture was filtered and extracted twice with water. After removing the water from the organic layer, organic layer was concentrated to dryness under reduced pressure. Then ethanol was added to precipitate a solid. The solid was collected, rinsed and dried to obtain the product N-(4-methoxyphenyl)dibenzo[b,d]thiophen-3-amine. The above reaction is shown in Formula 10.

[Formula 10]

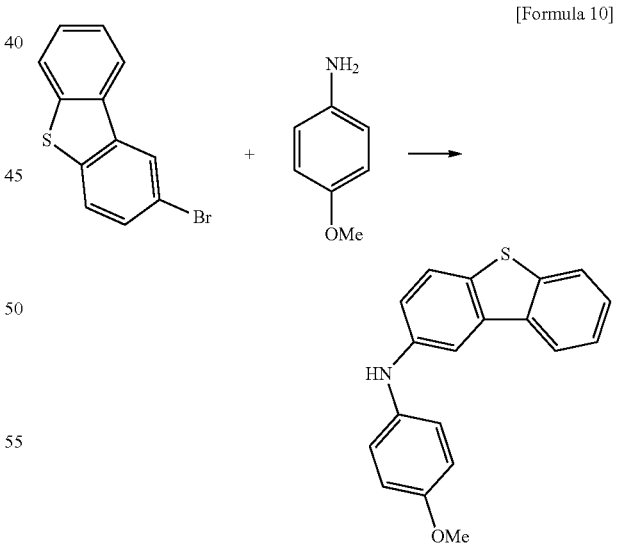

5 g of 3,6-dibromo-9-(4-bromophenyl)-9H-carbazole (the reaction is shown in formula 5), 10.2 g of N-(4-methoxyphenyl)dibenzo[b,d]thiophen-3-amine and 5 g of sodium tert-butoxide were mixed in a reaction flask. 125 mL of toluene was added to the reaction flask as solvent, then 0.3 g of palladium metal complex and 0.25 g of tri-tert-butylphosphine were added to the reaction flask as catalyst.

The mixture in the reaction flask was heated to 110° C. with stirring, and then cooled down to room temperature after one day of reaction. The reaction mixture was filtered and extracted twice with water. After removing the water from the organic layer, alumina was added to the organic layer. Then the organic layer was heated to 70° C. with stirring for 1 hour, and the filtered. The liquid was collected and concentrated to dryness under reduced pressure. Ethanol was added to precipitate a solid. The solid was collected, rinsed and dried, then the oxidizable compound A4 is obtained. The above reaction is shown in Formula 11.

added to the reaction flask as catalyst. The reaction mixture in the reaction flask was heated to 110° C. with stirring, and cooled down to room temperature after one day of reaction. The reaction mixture was filtered and extracted twice with water. After removing the water from the organic layer, the organic layer was concentrated to dryness under reduced pressure. After collecting the liquid, the product, 3,4,5-trimethoxy-N-(4-methoxyphenyl)aniline, can be obtained. The above reaction is shown in Formula 12.

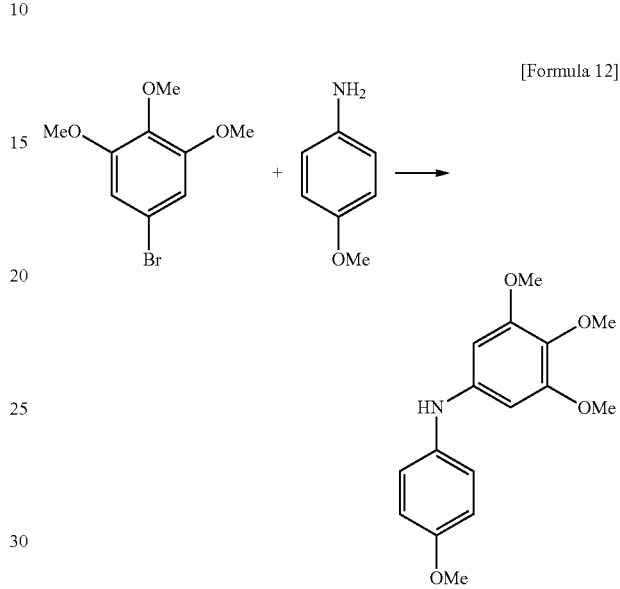

[Formula 12]

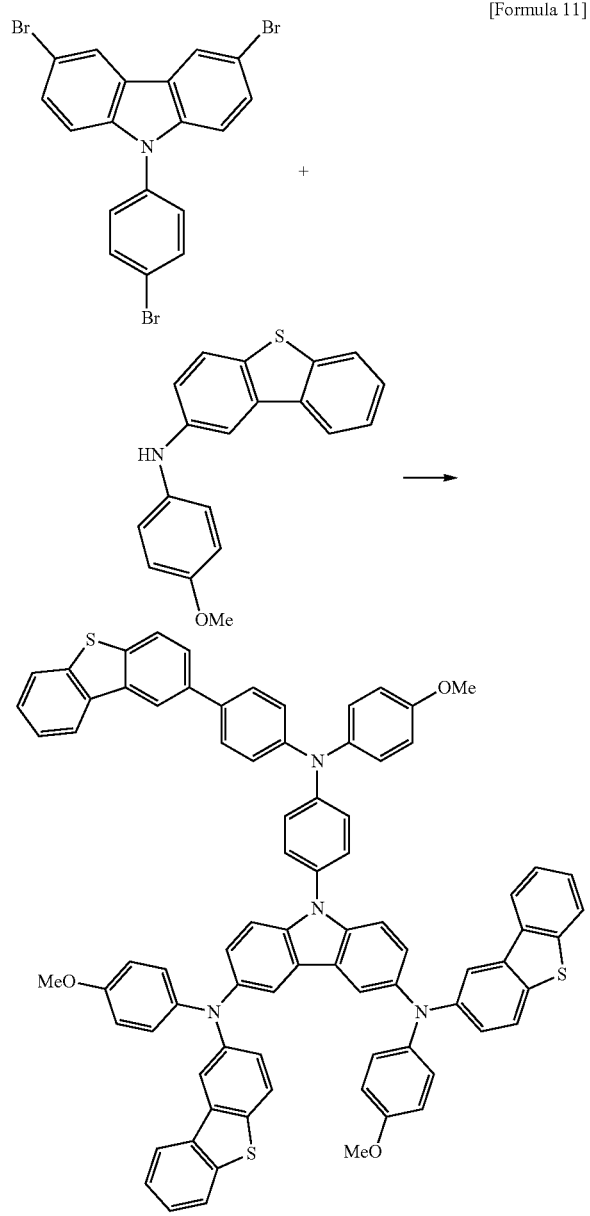

[Formula 11]

5 g of 3,6-dibromo-9-(4-bromophenyl)-9H-carbazole (the reaction was as shown in Formula 5), 9.6 g of 3,4,5-trimethoxy-N-(4-methoxyphenyl)aniline and 5 g of sodium tert-butoxide were mixed in a reaction flask. 125 mL of toluene was added to the reaction flask as solvent, and 0.3 g of palladium metal complex and 0.25 g of tri-tert-butylphosphine were added to the reaction flask as catalyst. The mixture in the reaction flask is heated to 110° C. with stirring, and cooled down to room temperature after one day of reaction. The reaction mixture was filtered and extracted twice with water. After removing the water from the organic layer, alumina was added to the organic layer. Then the organic layer was heated to 70° C. for 1 hour with stirring, and filtered. The liquid was collected and concentrated to dryness under reduced pressure. Ethanol was added to precipitate a solid. The solid was collected, rinsed and dried, then the oxidizable compound A5 is obtained. The above reaction is shown in Formula 13.

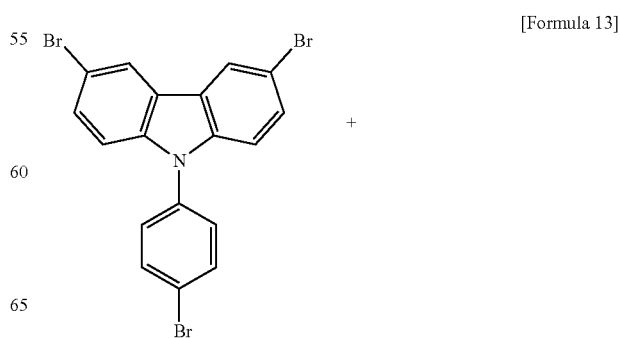

[Formula 13]

Oxidizable Compound A5

10 g of 5-bromo-1,2,3-trimethoxybenzene, 5.5 g of 4-methoxyaniline and 7.8 g of sodium tert-butoxide were mixed in a reaction flask. 150 mL of toluene was added to the reaction flask as solvent, and then 0.46 g of palladium metal complex and 0.49 g of tri-tert-butylphosphine were

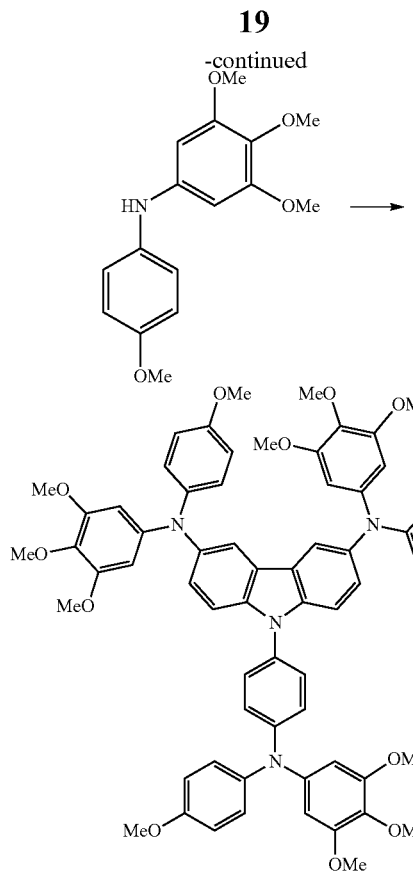

Oxidizable Compound A6

10 g of 1-bromo-4-methylbenzene, 6.9 g of p-toluidine and 11.2 g of sodium tert-butoxide were mixed in a reaction flask. 150 mL of toluene was added to the reaction flask as solvent, and 0.67 g of palladium metal complex and 0.71 g of tri-tert-butylphosphine were added to the reaction flask as catalyst. The mixture in the reaction flask was heated to 110° C. with stirring, and cooled down to room temperature after one day of reaction. The reaction mixture was filtered and extracted twice with water. After removing the water from the organic layer, the organic layer was concentrated to dryness under reduced pressure. Then ethanol was added to precipitate a solid. The solid was collected, rinsed and dried to obtain the product di-p-tolylamine. The above reaction is shown in Formula 14.

[Formula 14]

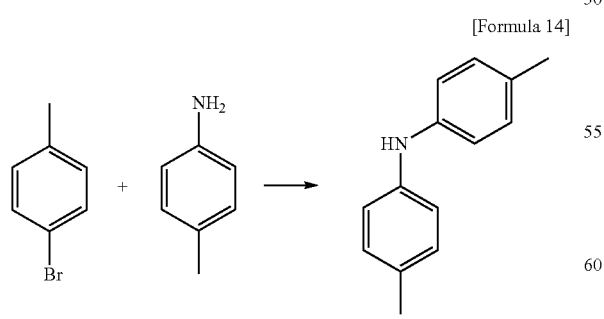

5 g of 3,6-dibromo-9-(4-bromophenyl)-9H-carbazole (the reaction is shown in Formula 5), 6.6 g of di-p-tolylamine and 5 g sodium tert-butoxide were mixed in a reaction flask. 125 mL of toluene was added to the reaction flask as solvent, and then 0.3 g of palladium metal complex and 0.25 g of tri-tert-butylphosphine were added to the reaction flask as catalyst. The mixture in the reaction flask was heated to 110° C. with stirring, and cooled down to room temperature after one day of reaction. The reaction mixture was filtered and extracted twice with water. After removing the water from the organic layer, alumina was added to the organic layer. Then the organic layer was heated to 70° C. for 1 hour with stirring, and filtered. The liquid was collected and concentrated to dryness under reduced pressure. Ethanol was added to precipitate a solid. The solid was collected, rinsed and dried to obtain the oxidizable compound A6. The above-mentioned reaction is shown in Formula 15.

[Formula 15]

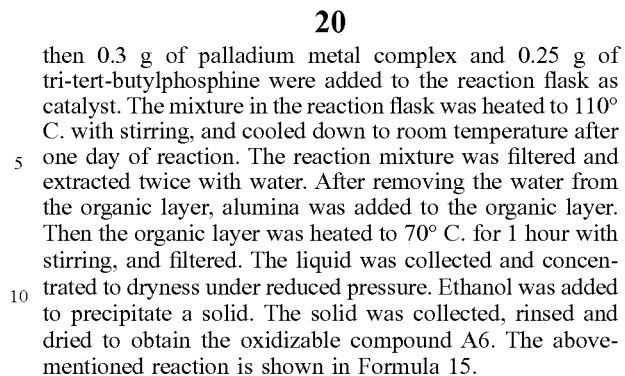

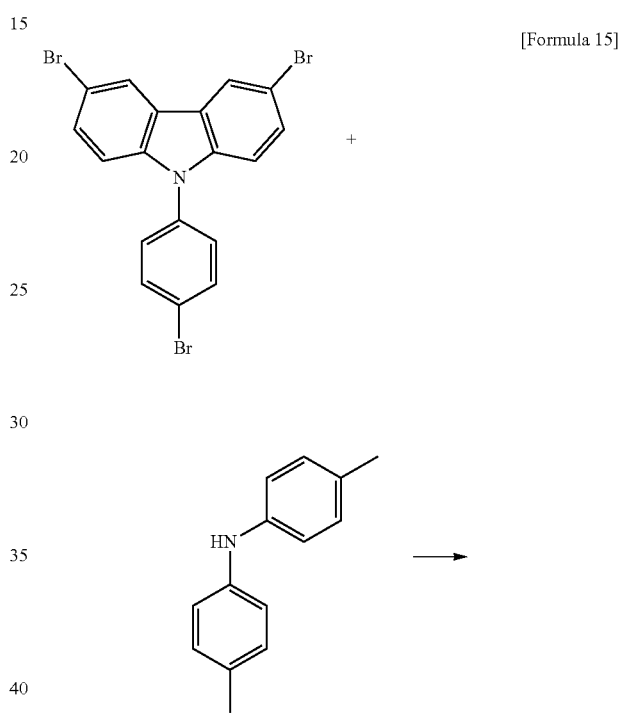

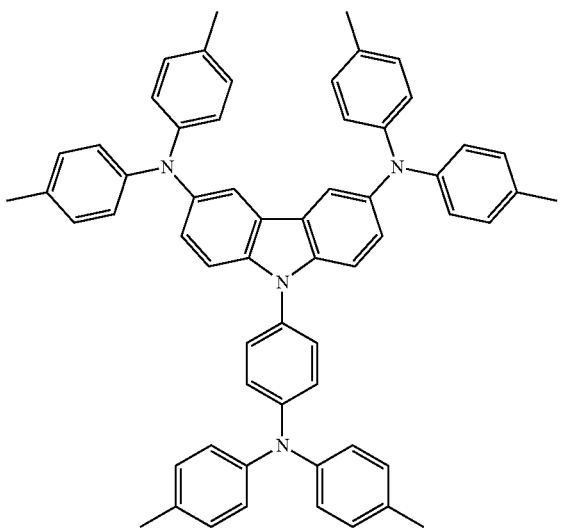

Compound B1

Compound B1, as a comparative example, is represented by the following chemical Formula 16.

[Formula 16]

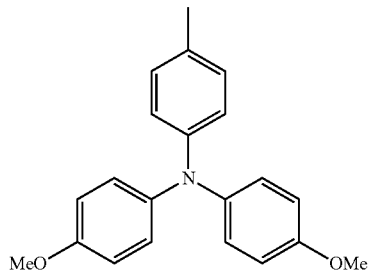

[Fabrication of Electrochromic Devices]

The fabrication of the electrochromic device in the Examples of the present disclosure will be described in detail below.

Device A1

The alkylammonium tetrafluoroborate was dissolved in gamma-butyrolactone (GBL) to form a 0.5M solution. The oxidizable compound A1 and the reducible compound octyl viologen were dissolved in the above solution to form an electrochromic composition solution, wherein the concentration of the oxidizable compound A1 was 0.05M, and the concentration of the viologen was 0.05M. Two ITO conductive glass plates were cut to the desired size. An isolating unit (epoxy resin) was used to isolate a cell between the conductive glass plates. The distance between the two ITO conductive glass plates was defined as about 100 um. The above mentioned prepared electrochromic composition solution was filled into the cell between the ITO conductive glass plates. Then the hole on the isolation unit was sealed to form the device A1.

Devices A2-A6

Devices A2-A6 were fabricated in the same manner as device A1, except that 0.05M of oxidizable compound A1 was replaced with 0.05M of oxidizable compound A2-A6, respectively.

Device B1

Device B1, as a comparative example, was fabricated in the same manner as device A1, except that 0.05M of oxidizable compound A1 was replaced with 0.05M of B1 compound.

[Transmittance Test]

Figure 2:
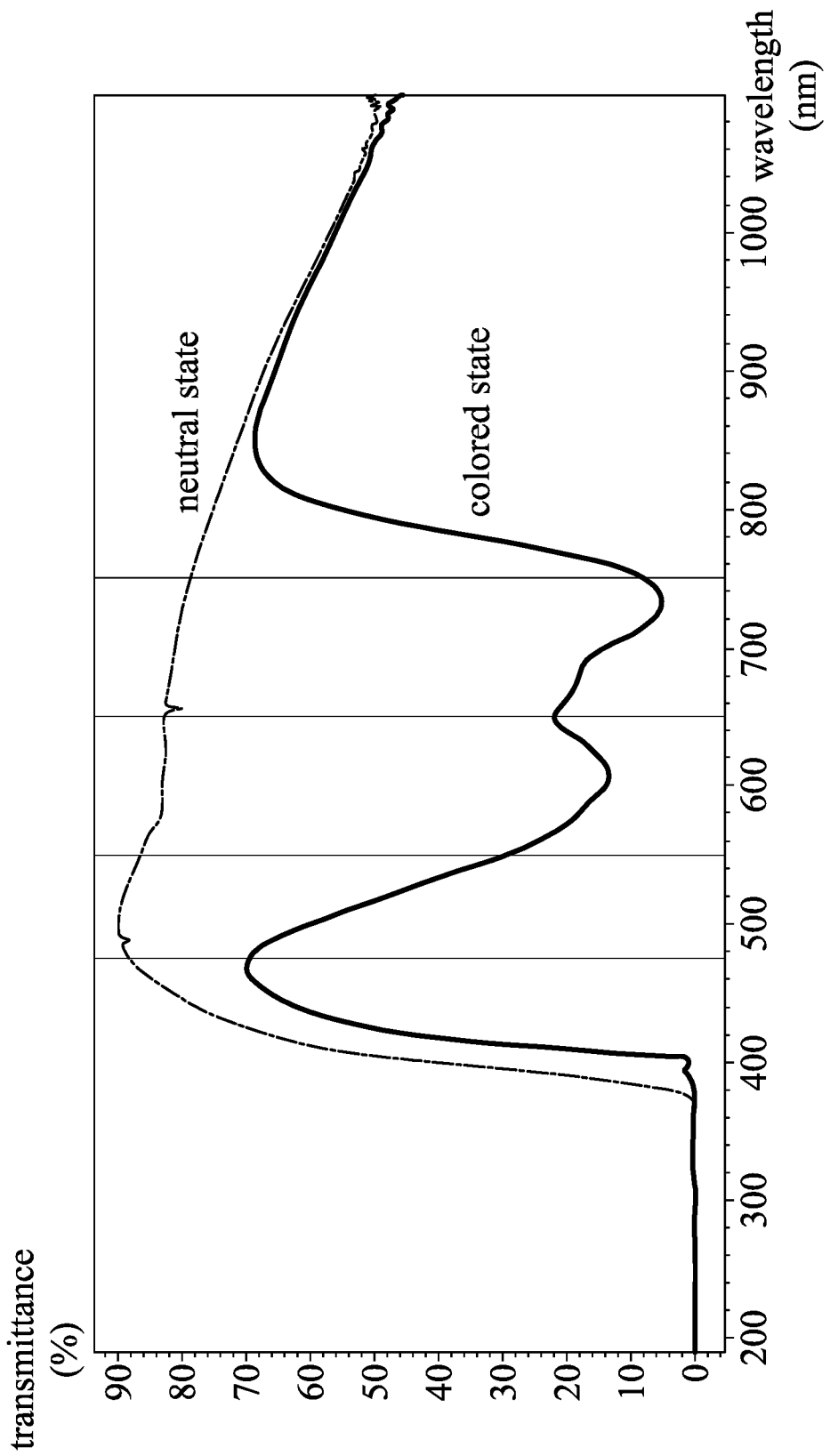
FIG. 2 shows the transmission spectrum of the device B1 in the neutral state and the colored state according to the embodiment of the present disclosure.

The UV-Vis spectra of the above devices were detected with an Agilent 8453 UV-Vis spectrometer at room temperature without working voltage applied (neutral state) and with working voltage of 1.2 V applied (colored state), respectively. The spectrum of device B1 is shown in FIG. 2, the spectra of devices A1-A6 are shown in FIGS. 3-8, respectively. The transmittances of the devices at different wavelengths under different conditions are listed in Table 1. After the device was switched on, due to the redox reaction between the oxidizable compound and the reducible compound in the electrochromic composition, the color of the device changed and the light transmittance of the device decreased.

TABLE 1

| Device | Transmittance (%) | | | Contrast ratio |
| --- | --- | --- | --- | --- |
| | 475 nm | 550 nm | 650 nm | Max/min |
| neutral state of B1 | 87.92 | 86.14 | 82.19 | 3.76/1.27 |
| colored state of B1 | 69.23 | 29.26 | 21.85 | |
| neutral state of A1 | 71.55 | 81.78 | 79.35 | 6.03/1.58 |
| colored state of A1 | 45.38 | 18.04 | 13.15 | |
| neutral state of A2 | 77.45 | 79.59 | 74.66 | 138/3.4 |
| colored state of A2 | 22.66 | 1.31 | 0.54 | |
| neutral state of A3 | 65.9 | 75.65 | 74.1 | 42/3.5 |
| colored state of A3 | 18.71 | 1.8 | 2.0 | |
| neutral state of A4 | 82.11 | 81.39 | 78.79 | 15.3/1.9 |
| colored state of A4 | 44.23 | 9.72 | 5.16 | |
| neutral state of A5 | 72.17 | 78.36 | 77.36 | 10.1/2 |
| colored state of A5 | 36.5 | 7.74 | 7.74 | |
| neutral state of A6 | 84.02 | 84.96 | 80.67 | 6/1.9 |
| colored state of A6 | 44.46 | 14.22 | 13.46 | |

The contrast ratio in Table 1 refers to the ratio of the transmittance of the neutral state of the device to the transmittance of the colored state of the device at a specific wavelength. For example, the maximum contrast ratio of the device A1 is the ratio of the transmittance of the neutral state to the transmittance of the colored state at a wavelength of 650 nm (79.35/13.15=6.03), and the minimum contrast ratio of the device A1 is the ratio of the transmittance of the neutral state to the transmittance of the colored state at a wavelength of 475 nm (71.55/45.38=1.58). The maximum contrast of device A2 is the ratio of the transmittance of the neutral state to the transmittance of the colored state at a wavelength of 650 nm (74.66/0.54=138), and the minimum contrast of the device A2 is the ratio of the transmittance of the neutral state to the transmittance of the colored state at a wavelength of 475 nm (77.45/22.66=3.4).

Figure 3:
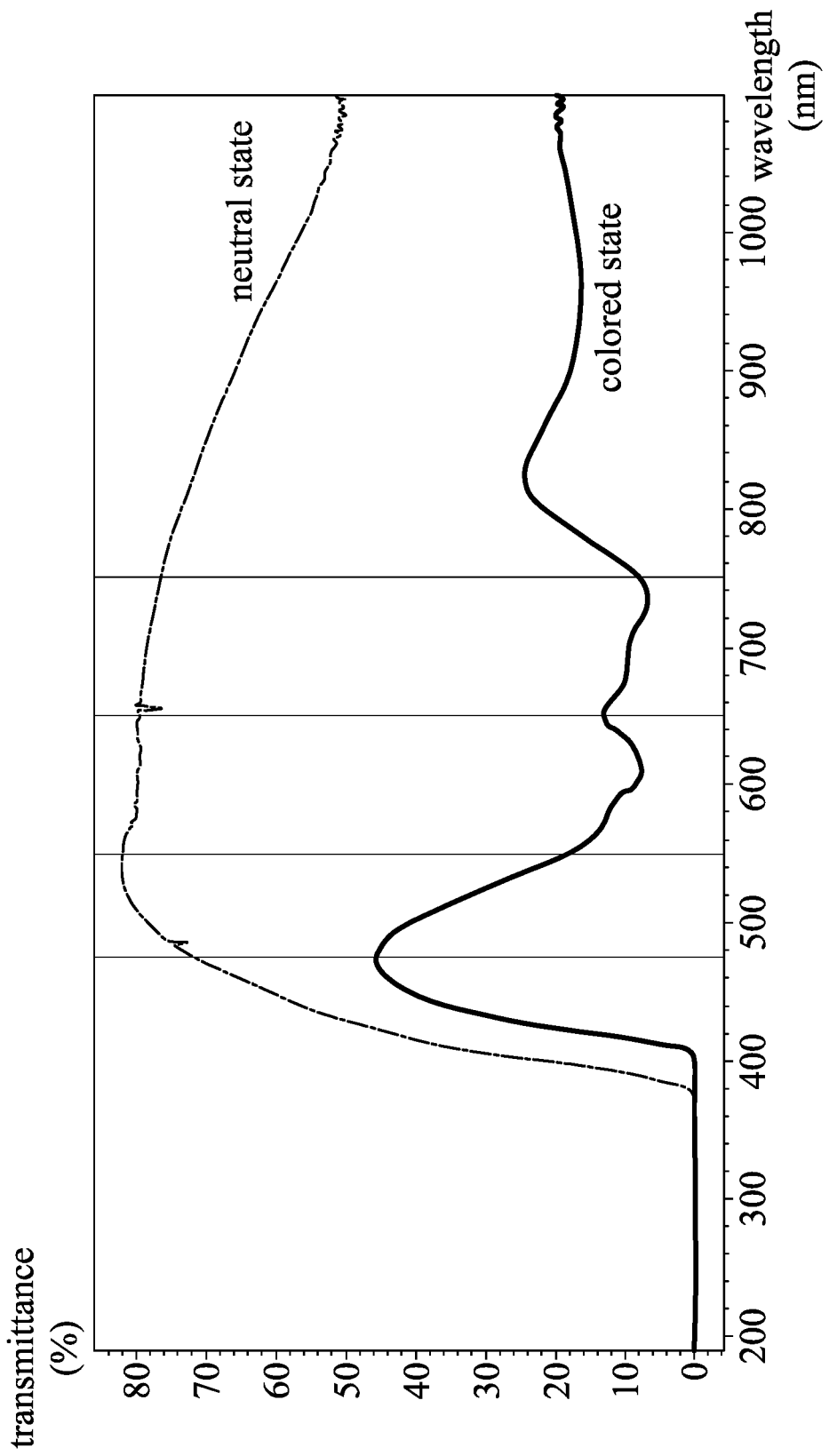
FIGS. 3-8 are the transmission spectra of devices A1-A6 in the neutral state and the colored state according to the embodiment of the present disclosure respectively.

Referring to Table 1 and FIGS. 2-3, and comparing device B1 with device A1, it can be found that the maximum contrast in the visible region (450 nm-700 nm) of the colored state of device B1 including a carbazole structured triphenylamine derivative (compound B1) as the oxidizable compound is significantly smaller than that of device A1, which included a carbazole structured triphenylamine derivative (oxidizable compound A1) as the oxidizable compound. Also, device B1 has a higher transmittance and poorer shielding property. The same conclusion can also be drawn by comparing device B1 and devices A2-A6 with reference to FIG. 2 and FIGS. 4-8.

Figure 4:
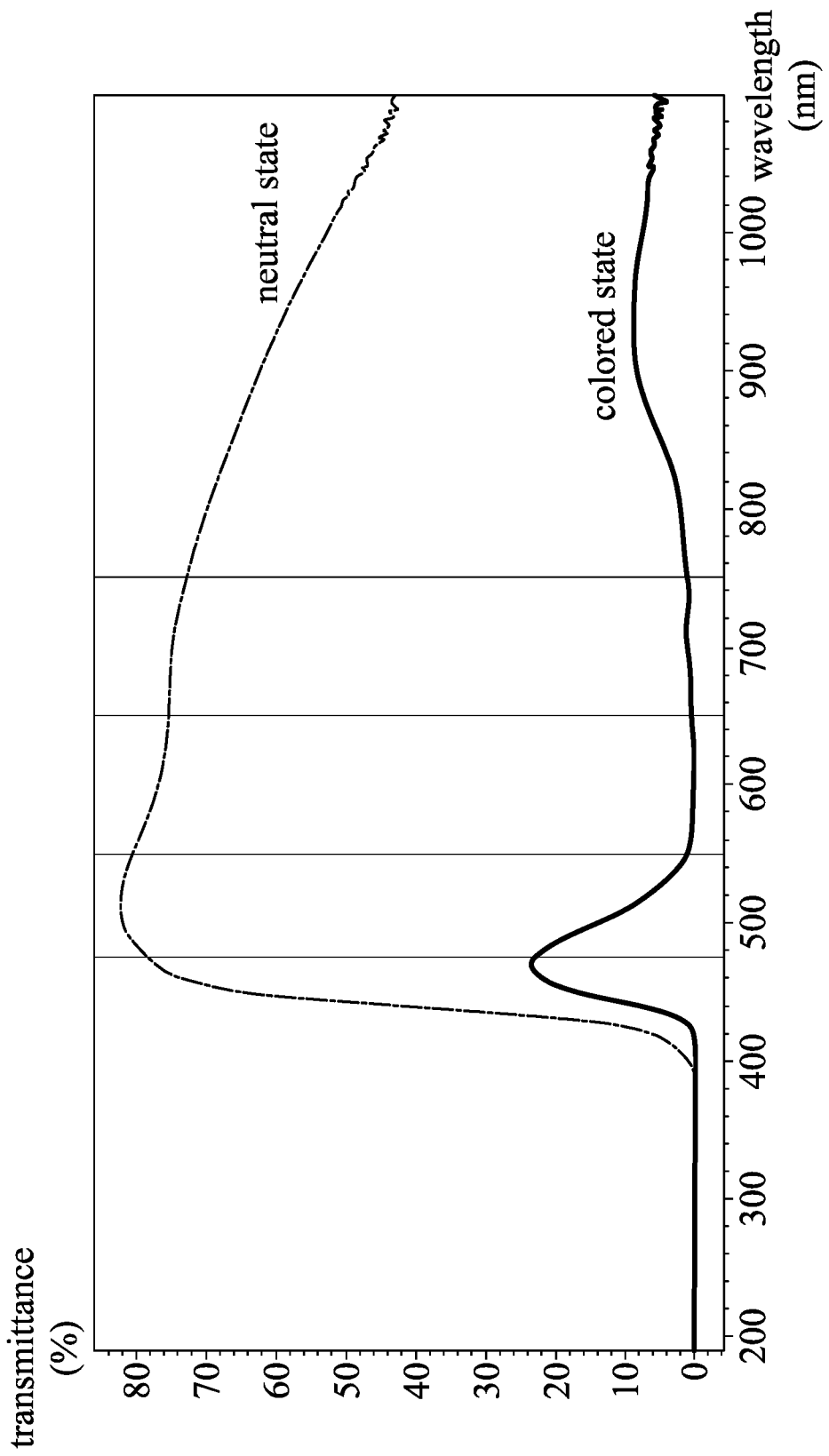
Figure 5:
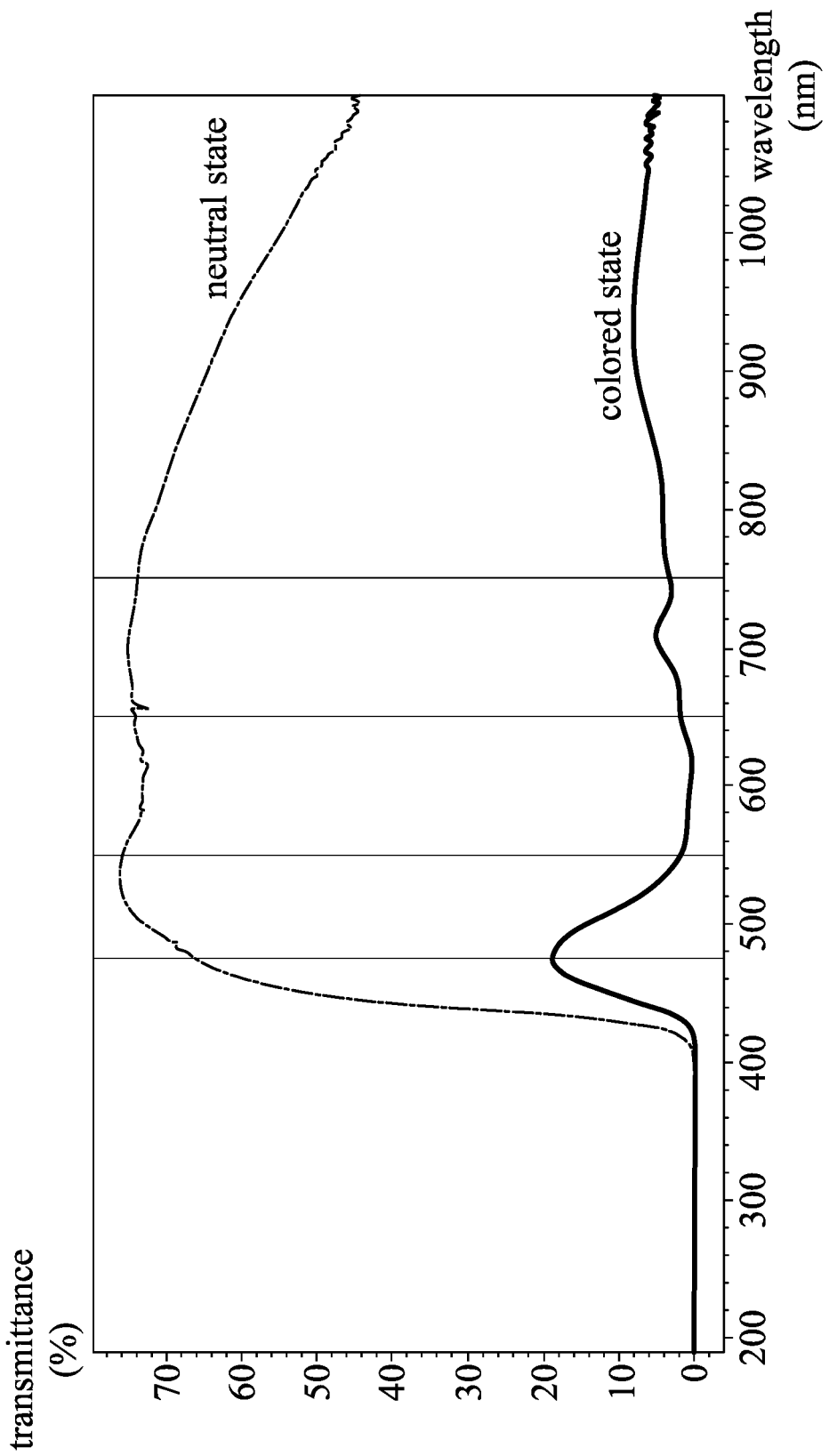
Figure 6:
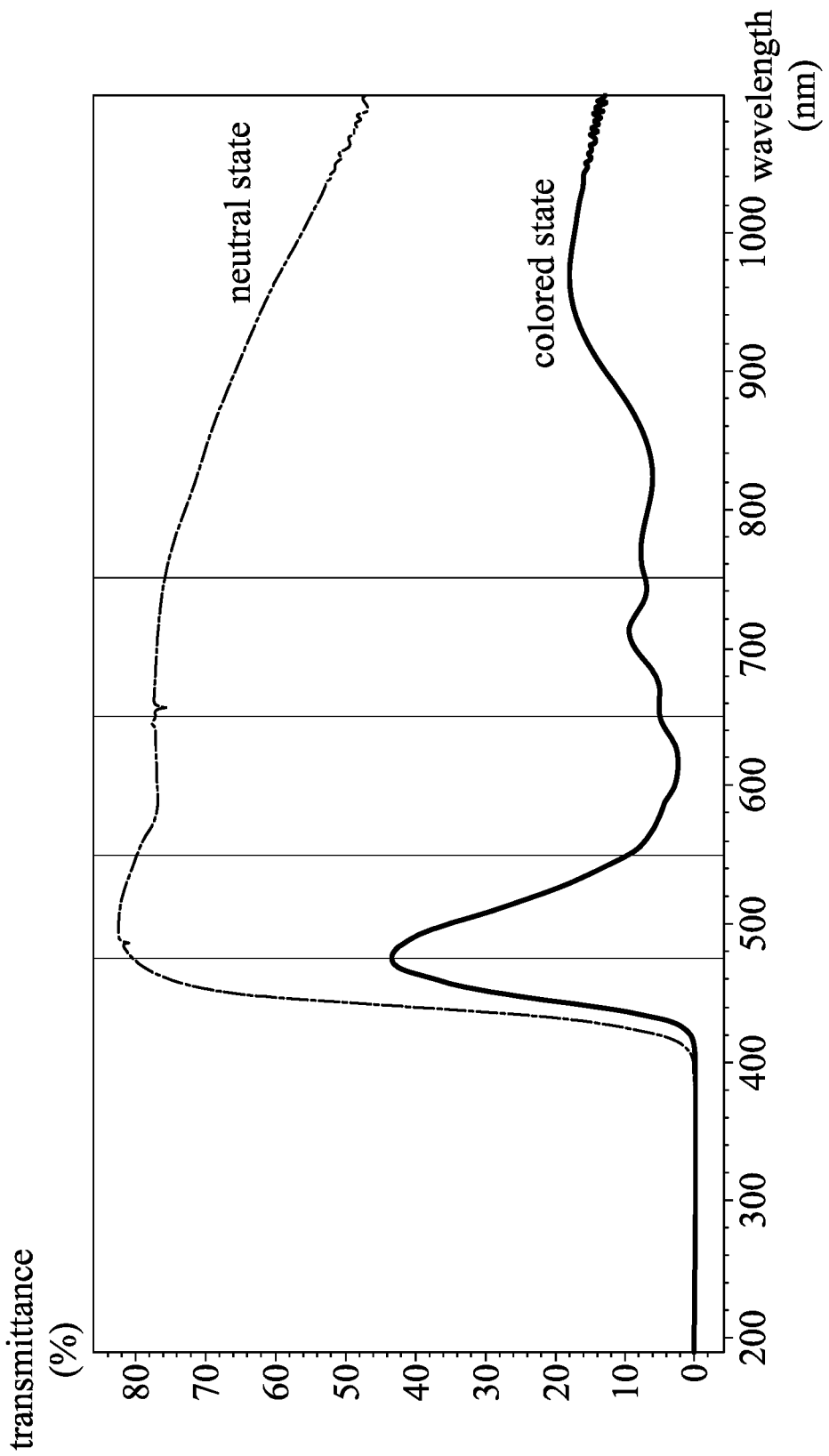
Figure 7:
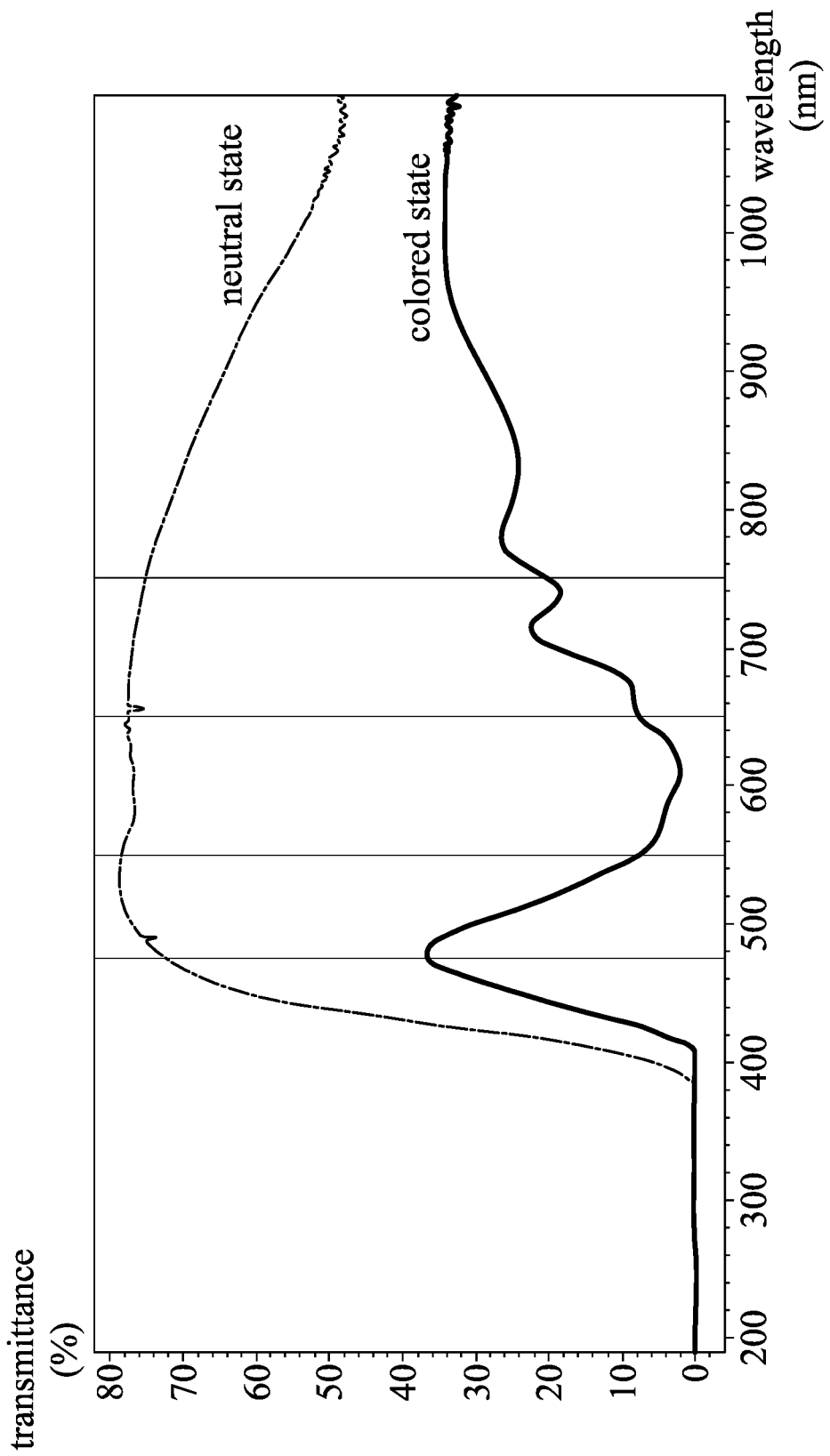

Referring to Table 1 and FIGS. 3-4, comparing the device A1 and the device A2. The oxidizable compound A2 in the device A2 has more triphenylamine groups in its chemical structure, and has the maximum contrast ratio at a wavelength of 650 nm (74.66/0.54=138). In contrast, the oxidizable compound A1 of device A1 has only a single triphenylamine group in its chemical structure, and its maximum contrast at a wavelength of 650 nm is 6.03. This shows that the more the number of triphenylamine groups in the chemical structure of the oxidizable compound, the greater the contrast ratio of the transmittance of the device has.

Figure 8:
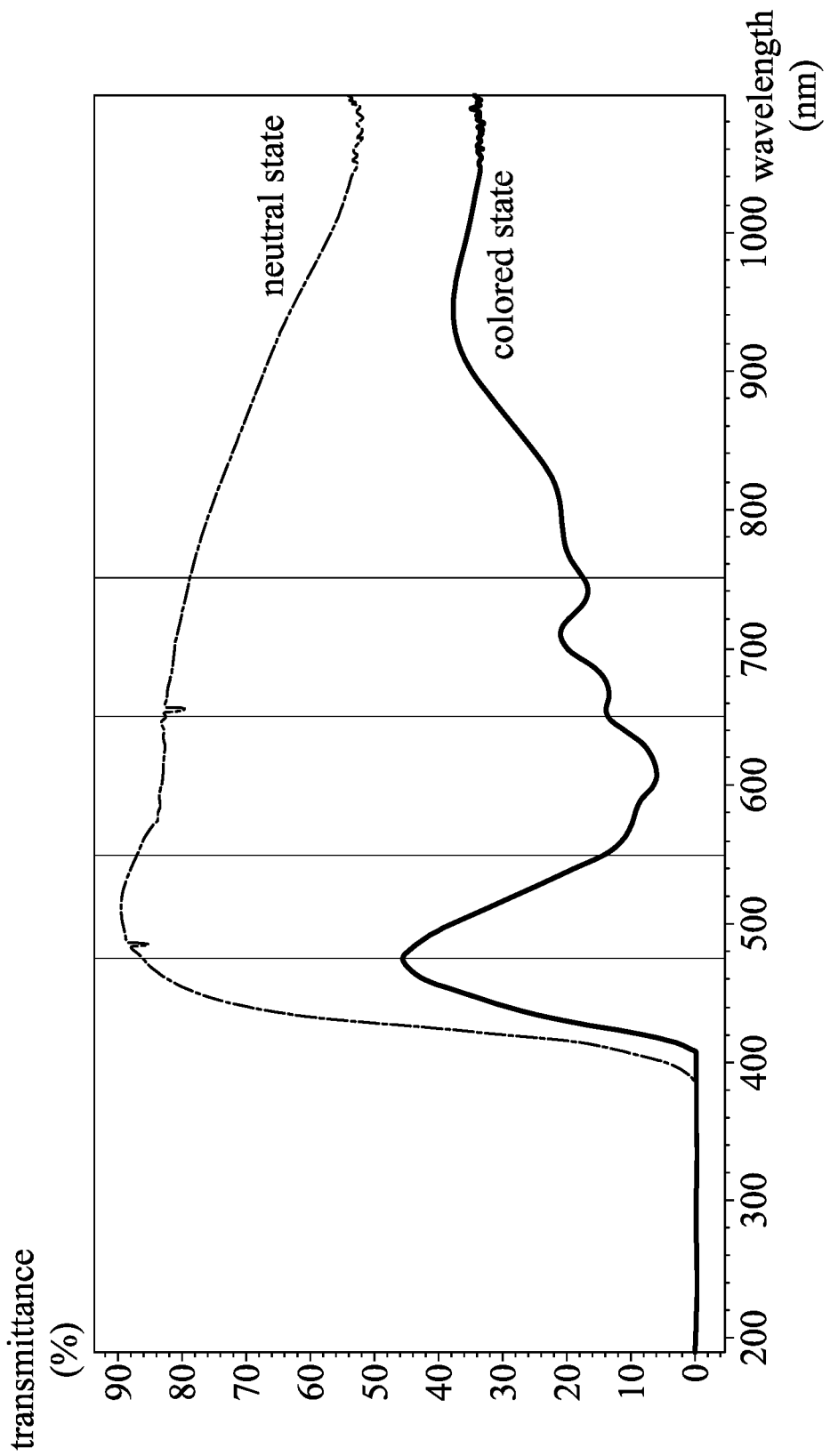

Referring to Table 1 and FIG. 4 and FIG. 8, comparing device A2 and device A6, when the oxidizable compound of the device has more triphenylamine groups in the chemical structure, and it has strong electron-donating groups at the para-position of the triphenylamine groups (oxidizable compound A2), the maximum contrast ratio of the device (device A2) is 138; when there is no strong electron-donating group on the triphenylamine group (oxidizable compound A6), the maximum contrast ratio of the device (device A6) is 6 (84.96/14.22). It can be seen that the device has the maximum contrast ratio when the oxidizable compound has strong electron-donating groups on the triphenylamine moiety. In addition, comparing device A2 with device A6 with reference to Table 1 and FIGS. 4-8, it can be seen that the contrast ratio of the oxidizable compound with strong electron-donating groups on the triphenylamine moiety is higher than that of the oxidizable compound without strong electron-donating groups on the triphenylamine moiety.

[High Temperature Reliability Test]

Figure 10:
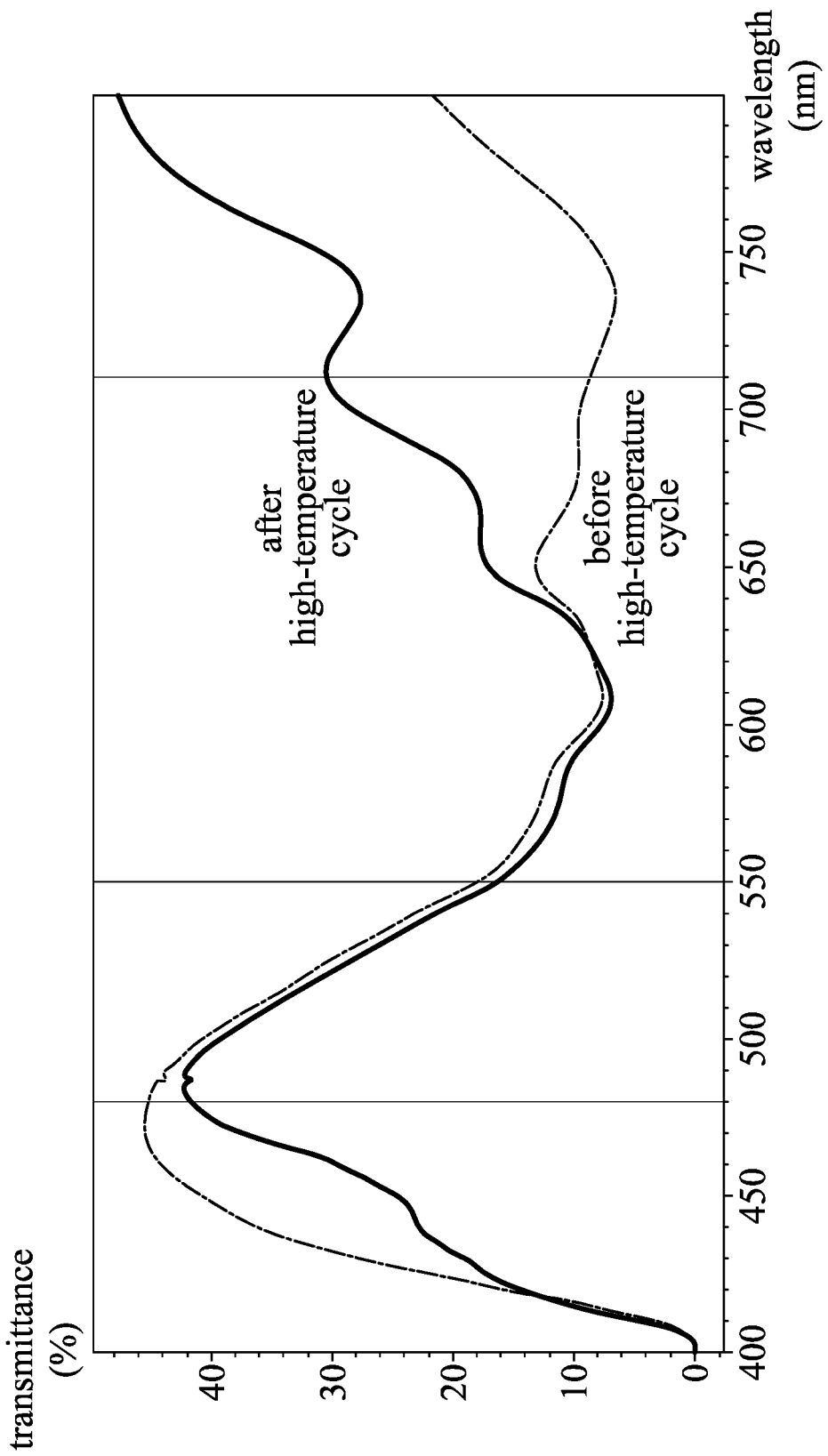
FIGS. 10-15 are the transmission spectra of the colored states of the devices A1-A6 before and after thermal cycle according to the embodiment of the present disclosure respectively.

First, a voltage of 1.2 V was applied to the device A1 at room temperature, and the transmission spectrum of the device in colored state was tested. Next, the device A1 was placed in an environment with a temperature of 85° C., and a voltage of 1.2V was applied to the device A1 (colored state) for 20 seconds, followed by a voltage of 0 V (neutral state) for 40 seconds. The above-mentioned cycle was repeated 5000 times, that is, the high temperature cycle was performed for 5000 minutes. After that, the device A1 was cooled down to room temperature, and a voltage of 1.2 V was applied to the device A1 to test the transmission spectrum of the device in colored state after the high temperature cycle. The transmission spectrum of the device A1 in colored state before and after the high temperature cycle is shown in FIG. 10. The decay value of the transmittance of the device at a specific wavelength is defined as the difference between the transmittance of the device after the high-temperature cycle and the transmittance of the device before the high-temperature cycle. That is, the transmittance after high temperature cycle (%)−transmittance before high temperature cycle (%)=decay value (%)). The decay value of device A1 at 710 nm wavelength is listed in Table 2.

Next, device B1 and devices A2-A6 were tested in the same way as device A1, the transmission spectra before and after the high temperature cycle are shown in FIG. 9, and FIGS. 11-15, respectively, and the decay values of device B1 and devices A2-A6 at 710 nm wavelength are shown in Table 2.

TABLE 2

| Device | Decay value (710 nm) |
|---|---|
| B1 | 25.3% |
| A1 | 21.8% |
| A2 | 7.2% |
| A3 | 19.4% |
| A4 | 13.2% |
| A5 | 10.3% |
| A6 | 17.8% |

Figure 9:
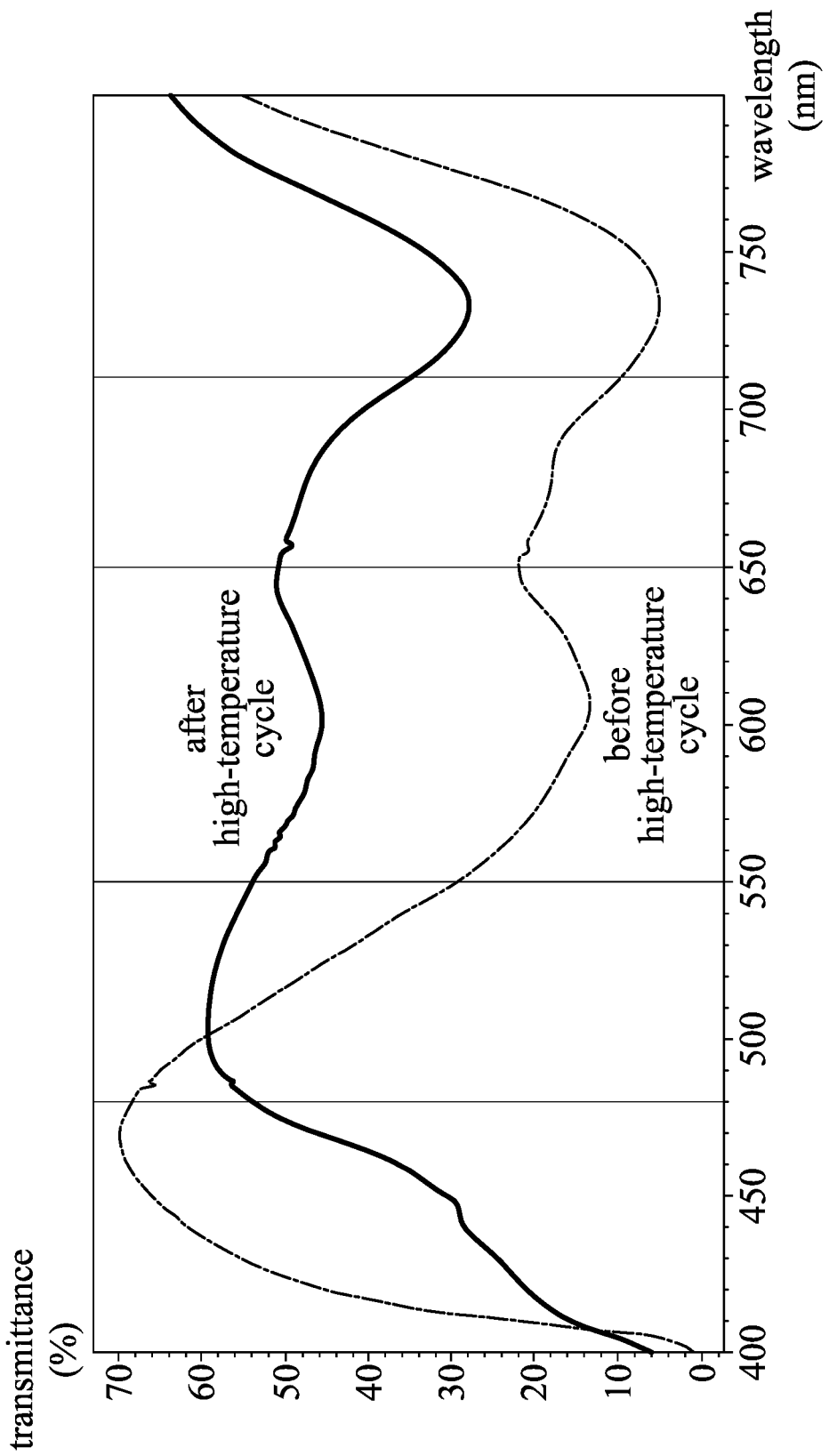
FIG. 9 is the transmission spectrum of the colored state of the device B1 before and after thermal cycle according to the embodiment of the present disclosure.

Referring to Table 2 and FIGS. 9-10, comparing the device A1 and the device B1, device A1 used compound A1 with carbazole structure as the oxidizable compound, and the decay value of device A1 at 710 nm wavelength was 21.8%, while device B1 used compound B1 without carbazole structure as the oxidizable compound, and the decay value of device B1 at 710 nm wavelength was 25.3%. It is evident that the decay value of device A1 is smaller than that of device B1. Therefore, the high temperature reliability of the carbazole-structure-containing triphenylamine derivatives can be demonstrated. In addition, referring to FIGS. 11-15, the same conclusion can also be drawn by comparing device B1 with devices A2-A6.

Figure 11:
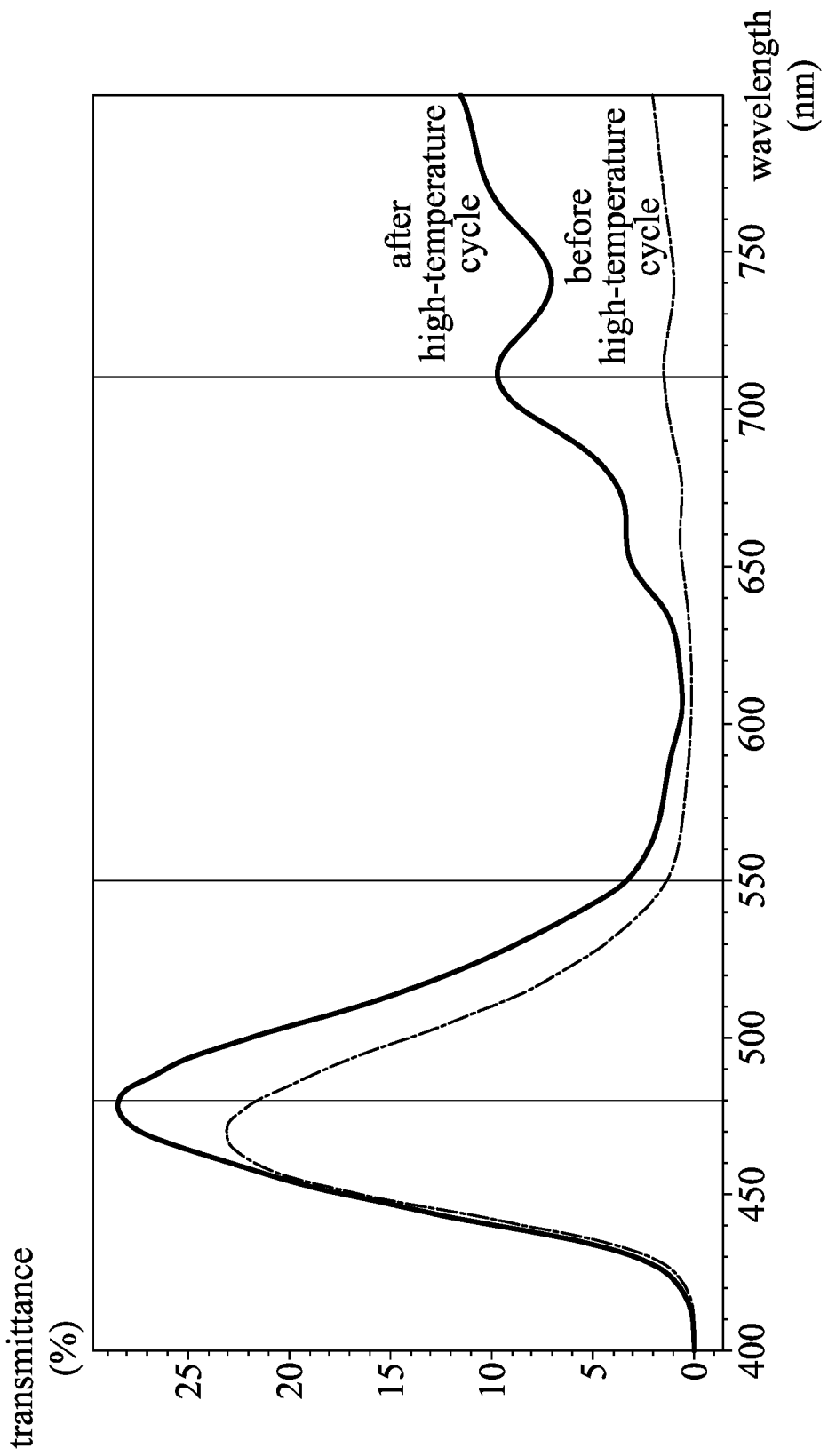

Referring to Table 2 and FIGS. 10-11, comparing device B1 and device A2, the chemical structure of oxidizable compound A2 in device A2 had more triphenylamine groups, and the decay value of device A2 at a wavelength of 710 nm was 7.2%. In contrast, the chemical structure of oxidizable compound A1 in the device A1 had only triphenylamine group, and the decay value of device A1 at a wavelength of 710 nm was 21.8%. It is clear that the more triphenylamine functional groups in the chemical structure of the oxidizable compound in the device, the better high temperature reliability of the device has. In addition, the same conclusion can also be drawn by comparing the device A1 with the devices A3-A6 by referring to FIGS. 12-15.

Figure 12:
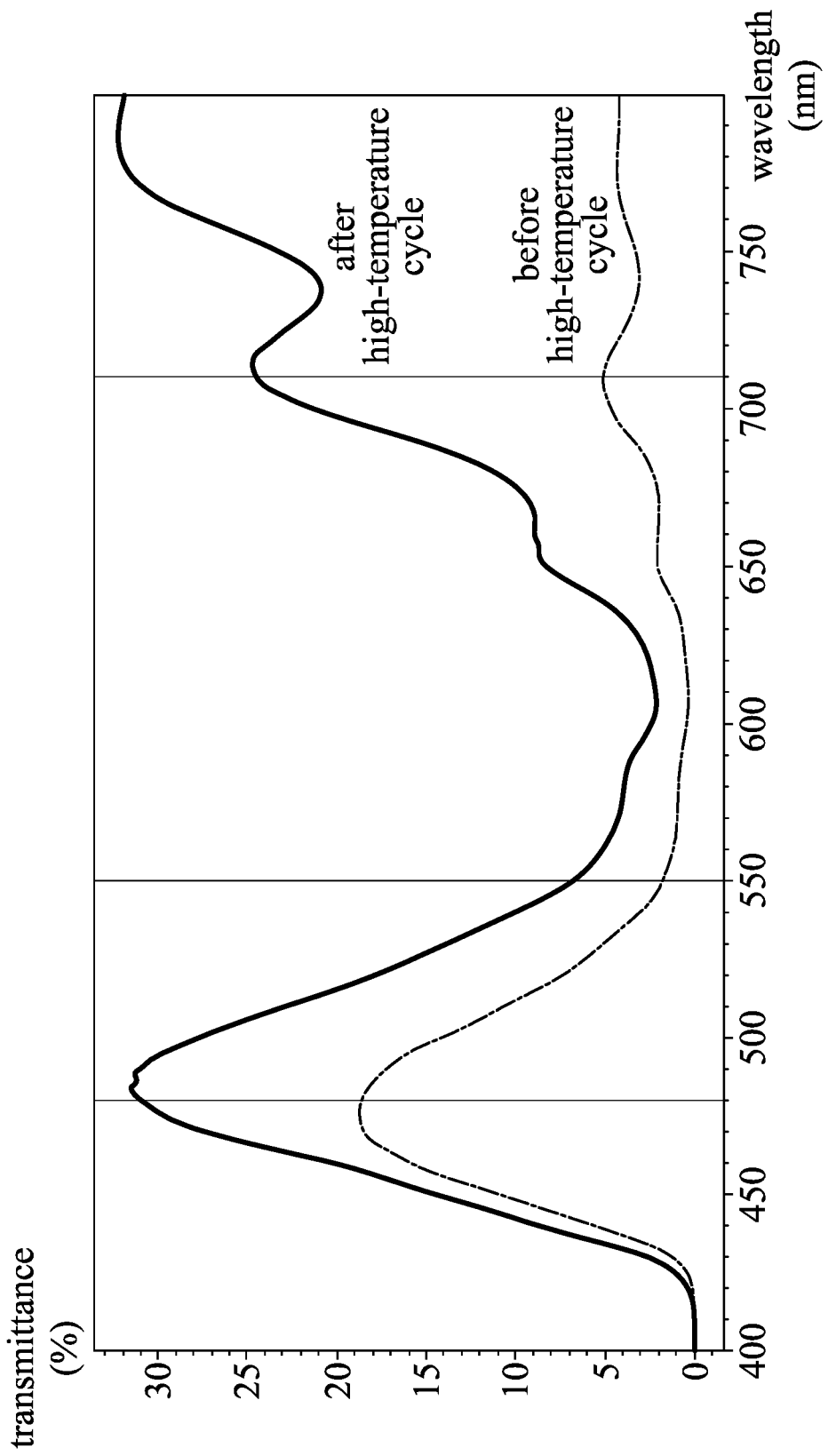
Figure 13:
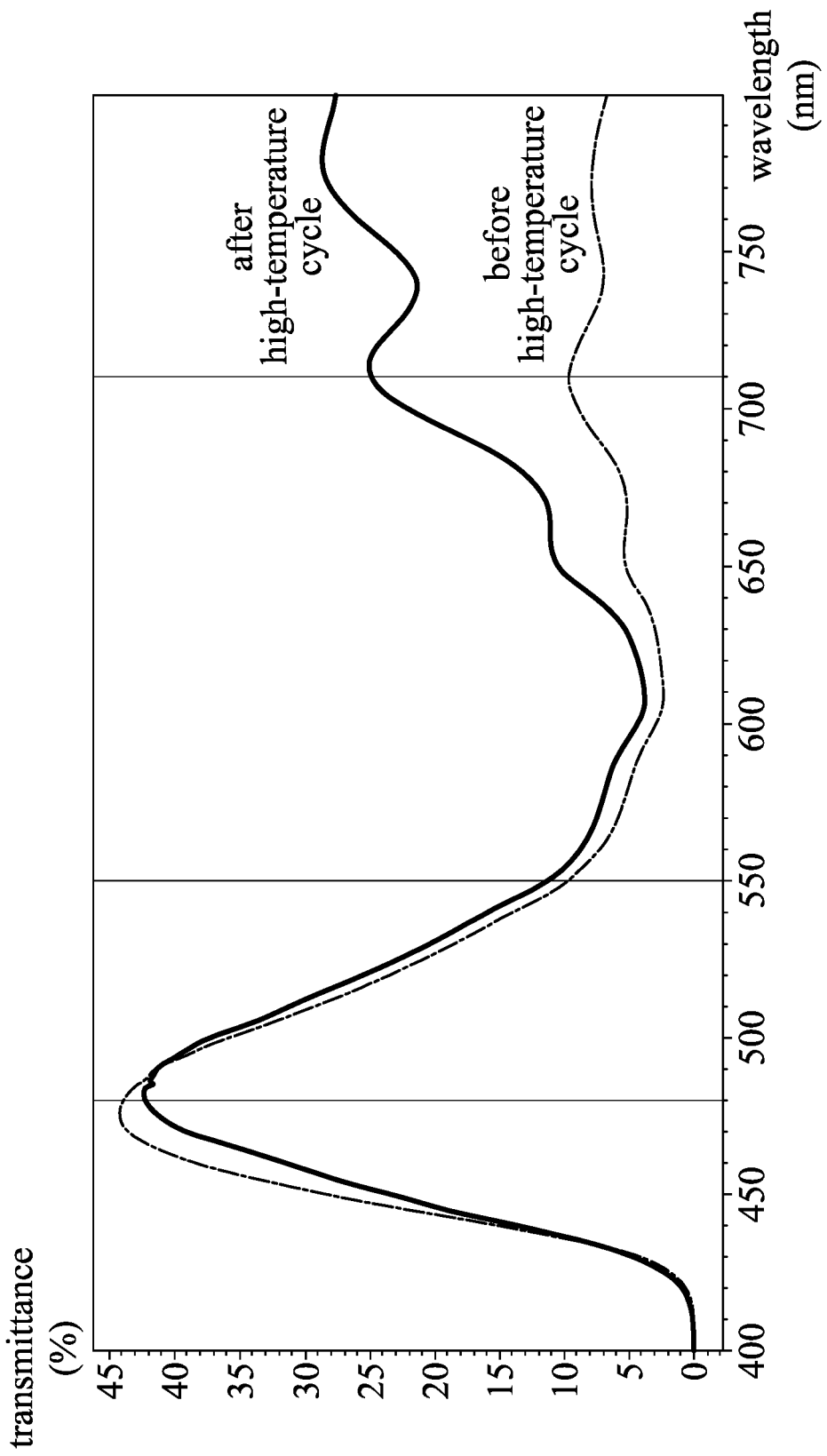
Figure 14:
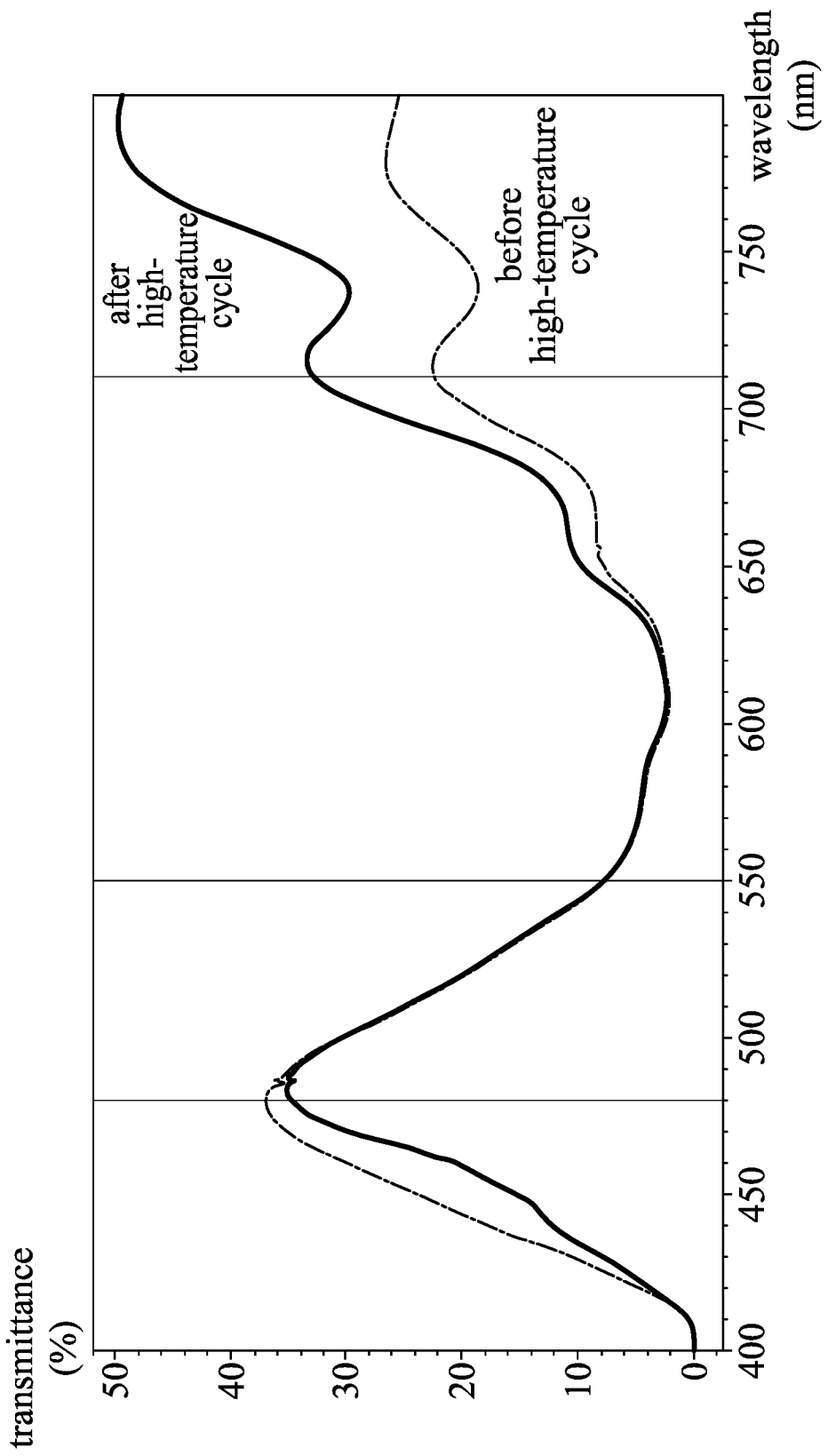
Figure 15:
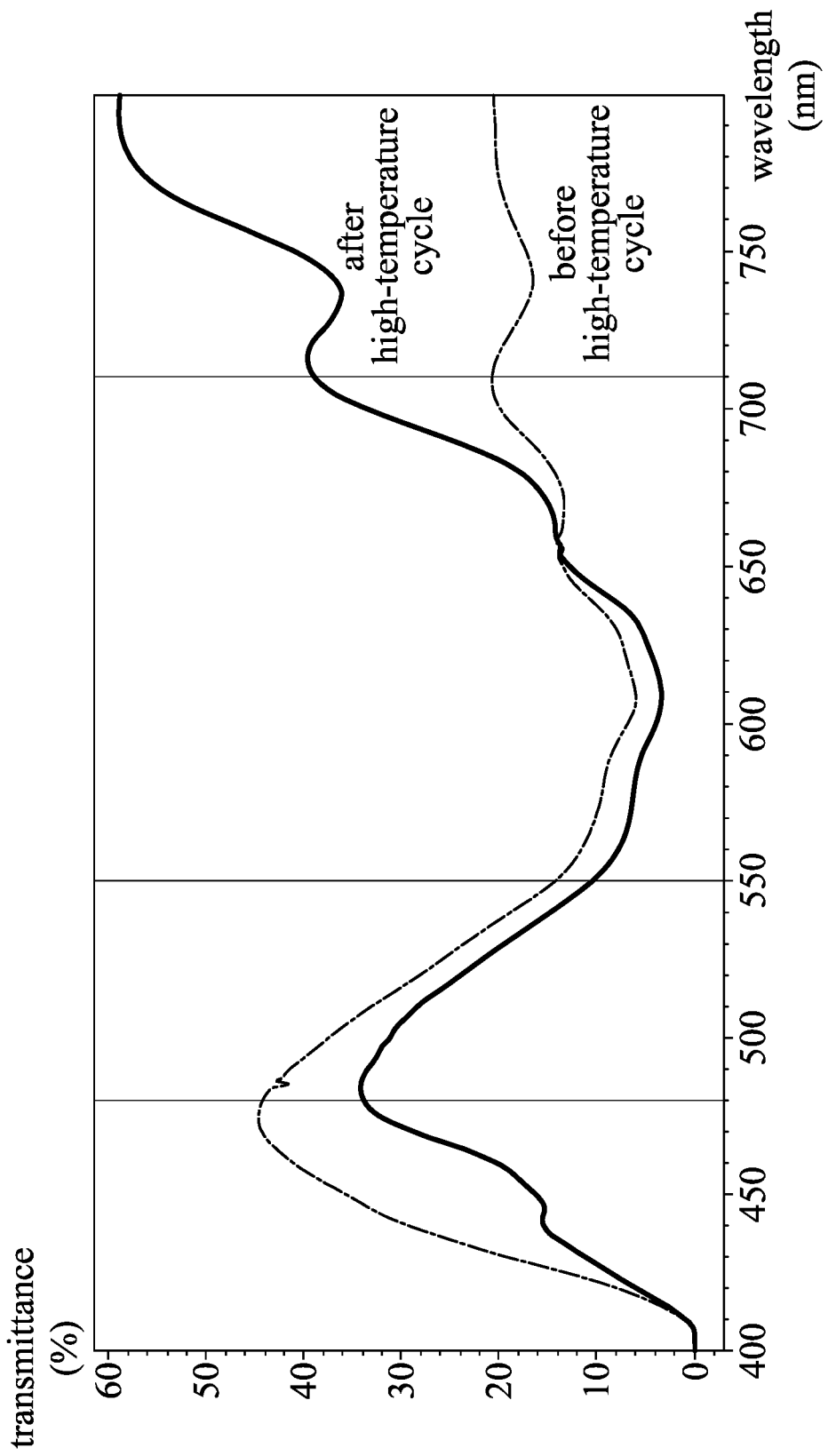

Referring to Table 2 and FIG. 11 and FIG. 12, comparing the device A2 and the device A3, when the oxidizable compound used in the device has more triphenylamine groups in chemical structure, and it has strong electron-donating groups at all the para-positions of the triphenylamine groups (oxidizable compound A2), the decay value of the device (device A2) at 710 nm wavelength is 7.2%, and when it has electron-withdrawing groups at the para-positions of the triphenylamine groups (oxidizable compound A3), the decay value of the device (device A3) at 710 nm wavelength is 19.4%. It can be known that when there are only electron-donating group on the para-position of the oxidizable compound, the device has better high-temperature reliability.

In the present disclosure, triphenylamine derivatives with novel structures are obtained by introducing carbazole structures. Compared with common triphenylamine compounds, the compounds of the present disclosure have better shielding property and high temperature reliability in the applications field of electrochromic. In addition, by modifying the triphenylamine derivatives through introducing more triphenylamine groups, the shielding property and the contrast ratio as well as the reliability of operation at high temperature in electrochromic application of the compounds can be further improved. In addition, by modifying the electron-donating and electron-withdrawing groups on the triphenylamine group, different oxidation potentials and absorption spectra can be obtained, so that the triphenylamine derivatives in the present disclosure provide more flexibility in use. In addition, compared with the triphenylamine polymer compounds commonly used in electrochromic, the small-molecule triphenylamine derivatives of the present disclosure are easier and less expensive to synthesize.

The present disclosure is developed based on electrochromic technology, and can be used in various future product applications, such as car windows, rearview mirrors, sunroofs, large-size smart windows in building, and the like. And the invention of the present disclosure can not only be used in liquid electrochromic systems, but can also be used in colloidal or solid state systems.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electrochromic composition, comprising:
a first oxidizable compound;
a reducible compound;
an electrolyte; and
a solvent,
wherein the first oxidizable compound is represented by the following formula:

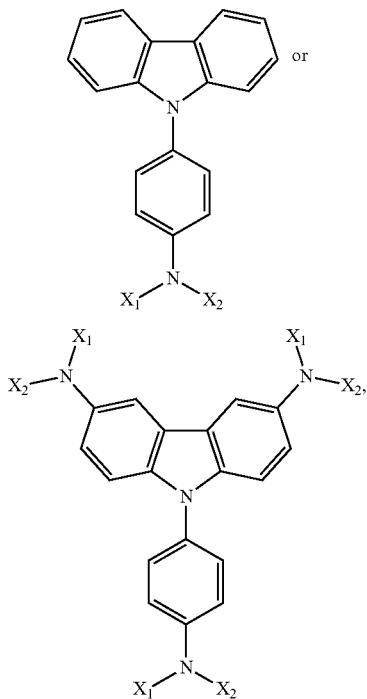

wherein X1, and X2 are independently substituted or unsubstituted aliphatic hydrocarbon groups, or substituted or unsubstituted aromatic hydrocarbon groups, wherein the aromatic hydrocarbon groups comprise:

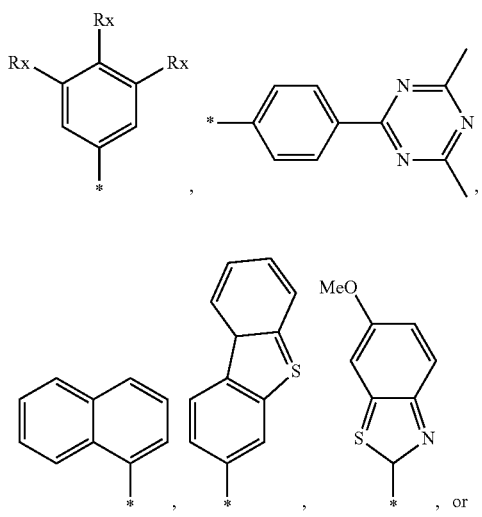

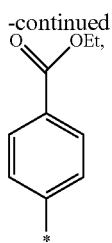

wherein each Rx is independently hydrogen, a C1-C16 alkyl group, a C1-C16 alkoxy group, a C1-C16 haloalkyl group, or halogen.

2. The electrochromic composition according to claim 1, wherein a concentration of the first oxidizable compound is between 0.01M and 0.5M.

3. The electrochromic composition according to claim 1, wherein a concentration of the reducible compound is between 0.01M and 0.5M.

4. The electrochromic composition according to claim 1, wherein the reducible compound is a viologen compound.

5. The electrochromic composition according to claim 1, wherein the reducible compound is represented by the following formula:

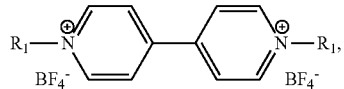

wherein R1 is a C1-C16 alkyl group.

6. The electrochromic composition according to claim 1, wherein a molar ratio of the first oxidizable compound to the reducible compound is 1:0.01 to 1:50.

7. The electrochromic composition according to claim 1, wherein a concentration of the electrolyte is between 0.01M and 5M.

8. The electrochromic composition according to claim 1, wherein the electrolyte comprises lithium salts, amine salts, tetraalkylammonium salts, or imidazolium salts.

9. The electrochromic composition according to claim 1, further comprising a second reducible compound different from the first reducible compound.

10. The electrochromic composition as claimed in claim 1, further comprising a UV absorber, a UV blocker, an IR absorber, an IR blocker, or a combination thereof.

11. An electrochromic device, comprising:
a pair of electrodes, comprising:
a first transparent substrate with a first transparent conductive layer on one of its surfaces; and
a second transparent substrate with a second transparent conductive layer on one of its surfaces, wherein the first transparent conductive layer and the second transparent conductive layer are disposed opposite to each other;
an isolating unit interposed between the first transparent conductive layer and the second transparent conductive layer such that a cell is formed between the first transparent substrate, the second transparent substrate and the isolating unit; and
an electrochromic compound filled into the cell, wherein the electrochromic compound is according to claim 1.

12. The electrochromic device according to claim 11, wherein a distance between the first transparent conductive layer and the second transparent conductive layer is between 1 μm and 300 μm.

13. The electrochromic device according to claim 11, wherein the isolating unit comprises a gap filler and an adhesive.

14. The electrochromic device according to claim 13, wherein the adhesive comprises a thermosetting adhesive, a photosetting adhesive, or a combination thereof.

15. The electrochromic device according to claim 13, wherein the gap filler comprises plastic, glass beads, sand powder, or a combination thereof.

* * * * *